(12) United States Patent
Jackson et al.

(10) Patent No.: US 11,299,409 B2
(45) Date of Patent: Apr. 12, 2022

(54) POLYMER COMPOSITIONS AND METHODS OF USE

(71) Applicants: KEMIRA OYJ, Helsinki (FI); CHEVRON U.S.A. INC., San Ramon, CA (US)

(72) Inventors: Logan Jackson, Norcross, GA (US); Thomas J. Lynch, Roswell, GA (US); Ronald Robinson, Newnan, GA (US); Frances Fournier, Woodstock, GA (US); Hong Yang, Atlanta, GA (US); Sukhjit Aujla, The Woodlands, TX (US); Do Hoon Kim, San Ramon, CA (US); Dennis Arun Alexis, San Ramon, CA (US); Varadarajan Dwarakanath, San Ramon, CA (US); David Espinosa, San Ramon, CA (US); Taimur Malik, San Ramon, CA (US)

(73) Assignees: KEMIRA OYJ, Helsinki (FI); CHEVRON U.S.A. INC., San Ramon, CA (US)

( * ) Notice: Subject to any disclaimer, the term of this patent is extended or adjusted under 35 U.S.C. 154(b) by 39 days.

(21) Appl. No.: 15/781,893

(22) PCT Filed: Dec. 7, 2016

(86) PCT No.: PCT/US2016/065397
§ 371 (c)(1),
(2) Date: Jun. 6, 2018

(87) PCT Pub. No.: WO2017/100331
PCT Pub. Date: Jun. 15, 2017

(65) Prior Publication Data
US 2020/0165778 A1 May 28, 2020

Related U.S. Application Data

(60) Provisional application No. 62/264,703, filed on Dec. 8, 2015.

(51) Int. Cl.
*D21H 17/37* (2006.01)
*C02F 1/56* (2006.01)
(Continued)

(52) U.S. Cl.
CPC .............. *C02F 1/56* (2013.01); *C02F 11/147* (2019.01); *C08J 3/07* (2013.01); *D21H 17/375* (2013.01); *C02F 2103/10* (2013.01)

(58) Field of Classification Search
None
See application file for complete search history.

(56) References Cited

U.S. PATENT DOCUMENTS

| 3,624,019 A | 11/1971 | Anderson et al. |
| 4,115,340 A | 9/1978 | Ellwanger |
| 5,067,508 A | 11/1991 | Lee et al. |

(Continued)

FOREIGN PATENT DOCUMENTS

CA 2545464 6/2005

OTHER PUBLICATIONS

Hubbe et al.,"Retention and Interactions ,Review",BioResources 4(2),pp. 850, 861-867, 2009, [online], Retrieved from the Internet,[retrieved May 17, 2020, <URL:https://bioresources.cnr.ncsu.edu/BioRes_04/BioRes_04_2_0850_Hubbe_NM_RetAids_Review.pdf> (Year: 2009).*

(Continued)

*Primary Examiner* — Dennis R Cordray
(74) *Attorney, Agent, or Firm* — Eversheds Sutherland (US) LLP

(57) ABSTRACT

Provided herein are liquid polymer (LP) compositions comprising an acrylamide (co)polymer, as well as methods for preparing inverted polymer solutions by inverting these LP compositions in an aqueous fluid. The resulting inverted polymer solutions can have a concentration of acrylamide (co)polymer of from about 50 to about 15,000 ppm, and a (Continued)

filter ratio of 1.5 or less at 15 psi using a 1.2 μm filter. Also provided are methods of using these inverted polymer solutions in dewatering, clarification, flocculation and/or thickening applications, and the like.

15 Claims, 10 Drawing Sheets

(51) Int. Cl.
<table>
<tr><td><i>C02F 11/14</i></td><td>(2019.01)</td></tr>
<tr><td><i>C08J 3/07</i></td><td>(2006.01)</td></tr>
<tr><td><i>C02F 11/147</i></td><td>(2019.01)</td></tr>
<tr><td><i>C02F 103/10</i></td><td>(2006.01)</td></tr>
</table>

(56) References Cited

U.S. PATENT DOCUMENTS

| | | | | |
|---|---|---|---|---|
| 5,763,530 | A * | 6/1998 | Chen | C08J 3/005 |
| | | | | 524/521 |
| 7,776,181 | B2 * | 8/2010 | Mori | C08B 31/10 |
| | | | | 162/168.3 |
| 7,776,958 | B2 | 8/2010 | Strominger et al. | |
| 10,619,087 | B2 * | 4/2020 | Kim | C09K 8/588 |
| 10,626,320 | B2 * | 4/2020 | Kim | C09K 8/584 |
| 2011/0118153 | A1 | 5/2011 | Pich et al. | |
| 2011/0151517 | A1 | 6/2011 | Therre et al. | |
| 2015/0197439 | A1 | 7/2015 | Zou et al. | |
| 2016/0333253 | A1 * | 11/2016 | Logan | B01F 5/0471 |
| 2017/0037298 | A1 * | 2/2017 | Li | C08F 220/56 |

OTHER PUBLICATIONS

"Hypermer 2296", Croda Industrial Chemicals, Product sheet, no date, [online], retrieved from the Internet, [retrieved Nov. 9, 2020], < URL: https://www.crodaindustrialchemicals.com/en-gb/products-and-applications/product-finder/product/641/Hypermer_1_2296>. (Year: 2020).*

"TWEEN 81", Croda Industrial Chemicals, Product sheet, no date, [online], retrieved from the Internet, [retrieved Nov. 9, 2020], URL: https://www.crodaindustrialchemicals.com/en-gb/products-and-applications/product-finder/product/398/Tween_1_81 (Year: 2020).*

"Plurafac® LF 400", BASF, Product sheet, no date, [online], retrieved from the Internet, [retrieved Nov. 9, 2020], , <URL:https://www.formulation-technologies.basf.com/ProductDetails?PRD=30044021>. (Year: 2020).*

Commonly Used Emulsifiersand Their HLB Values, The Pharmaceutics and Compounding Laboratory, UNC,1996-2021, [online], retrieved from the Internet, [retrieved May 29, 2021, <URL: https://pharmlabs.unc.edu/labs/emulsions/hlb.htm>. (Year: 2021).*

International Search Report from PCT/US2016/065397, dated Apr. 4, 2017.

Search Report issued by the Brazilian Patent Office for application 112018011684-0, dated Feb. 27, 2020.

Feng, Z. et al., "Hydrophobically Associating AM/DBA Copolymers for EOR," Chinese Journal of Applied Chemistry, 2004, 21(6), 556-558.

Second Office Action (English translation) mailed in Chinese Patent Application No. 2016/80081402.6 dated Aug. 17, 2021.

* cited by examiner

POLYMER COMPOSITIONS AND METHODS OF USE

CROSS REFERENCE TO RELATED APPLICATIONS

The application is a national stage application under 35 U.S.C. § 371 of International Application No. PCT/US2016/065397, filed Dec. 7, 2016, which claims priority to U.S. Provisional Application No. 62/264,703, filed Dec. 8, 2015. The complete disclosure of each of the above-identified applications is fully incorporated herein by reference

BACKGROUND

In the water treatment field, materials such as suspended solids are separated from water by a variety of processes, including sedimentation, straining, flotation, filtration, coagulation, flocculation, and emulsion breaking among others. Additionally, after suspended solids are removed from the water they must often be dewatered so that they may be further treated or properly disposed of. Liquids treated for solids removal often have as little as several parts per billion of suspended solids or dispersed oils, or may contain large amounts of suspended solids or oils.

Some separation processes include the treatment of raw water with certain polymers which settle suspended particulates. Examples of polymers include water-soluble polymers such as polyacrylamide and copolymers of acrylamide with other monomers. These polymers are made available commercially as powders or finely divided solids which were subsequently dissolved in an aqueous medium at their time of use. Because such dissolution steps are sometimes time consuming and often require rather expensive mixing equipment, sometimes polymers are provided in a liquid form, such as dispersions or water-in-oil emulsions wherein the polymer is dissolved in the dispersed aqueous phase.

SUMMARY

Provided herein are methods preparing an inverted polymer solution comprising: providing a liquid polymer (LP) composition; inverting the LP composition in an aqueous fluid to provide an inverted polymer solution having a concentration of synthetic (co)polymer of from 50 to 15,000 ppm; wherein the inverted polymer solution has a filter ratio of 1.5 or less at 15 psi (+/−10%) using a 1.2 µm filter. The LP composition may comprise: one or more hydrophobic liquids having a boiling point at least 100° C.; at least 39% by weight of one or more synthetic (co)polymers; one or more emulsifier surfactants; and one or more inverting surfactants. The LP composition may comprise: one or more hydrophobic liquids having a boiling point at least 100° C.; up to 38% by weight of one or more synthetic (co)polymers; one or more emulsifier surfactants; and one or more inverting surfactants. The inverted polymer solutions can be used in flocculation processes, centrifugation processes, dewatering of mineral slurries, settling processes, thin lift dewatering, emulsion breaking, sludge dewatering, raw water clarification, waste water clarification, drainage or retention processes in the manufacture of pulp and paper, flotation processes in mining applications, color removal, agricultural applications, municipal or industrial waste water treatment, clarification of primary or secondary industrial or municipal waste, potable water clarification, sludge composting, land application of sludge, pelletization for fertilizer application, release or recycling of clarified water, papermaking, food waste dewatering, coal refuse dewatering and thickening, tailings thickening, Bayer process applications, dewatering and clarification of fermentation broths, dewatering aqueous suspensions of dispersed solids, deinking of paper mill process water, clarification of oily waste water, clarification of food processing waste, making paper or paperboard from a cellulosic stock, soil amendment, reforestation, erosion control, seed protection or growth, other clarification processes, other thickening processes, other solid-liquid separation processes, or other processes involving dewatering of suspensions. In other embodiments, the method alternatively comprises providing an LP composition in the form of an inverse emulsion comprising: one or more hydrophobic liquids having a boiling point at least 100° C.; up to 35% by weight of one or more synthetic (co)polymers; one or more emulsifier surfactants; and one or more inverting surfactants.

Certain exemplary methods of dewatering an aqueous suspension of dispersed solids, methods of clarifying industrial waste water, methods of removing oil from industrial waste water; and methods for dewatering sludge are also provided herein.

DETAILED DESCRIPTION

Figure 1:
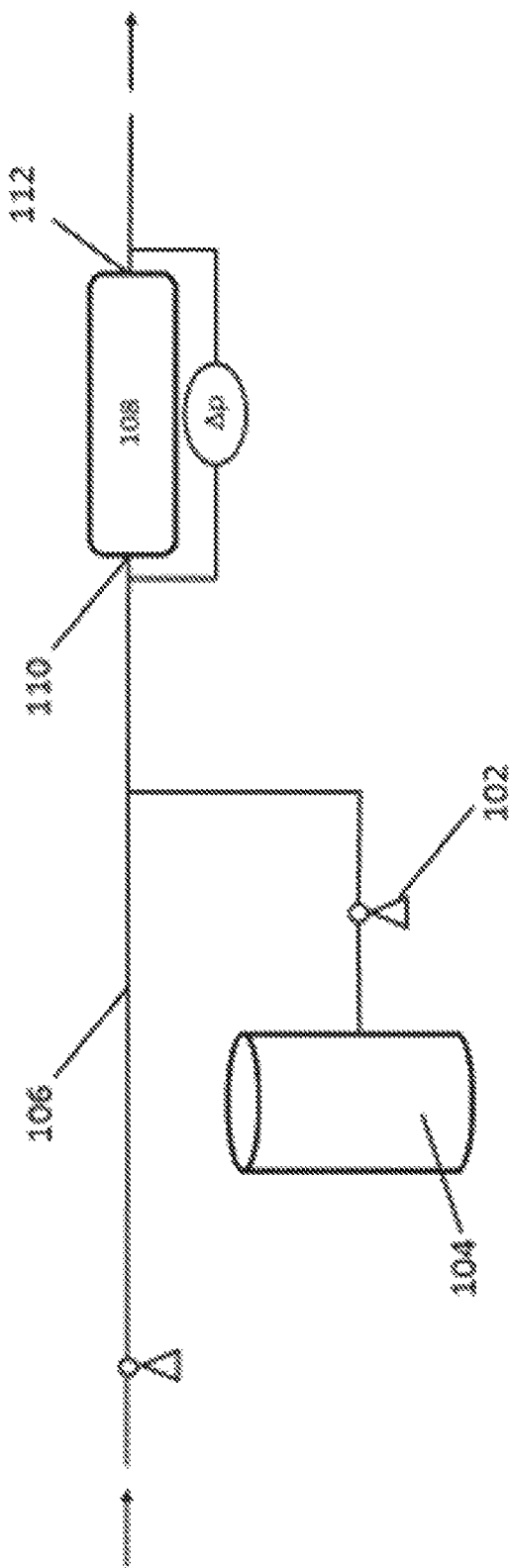
FIG. 1 is a process flow diagram illustrating a single step process for preparing an inverted polymer solution.

Provided herein are liquid polymer (LP) compositions comprising a synthetic polymer, such as an acrylamide (co)polymer, as well as methods for preparing inverted polymer solutions by inverting these LP compositions in an aqueous fluid. Also provided are methods of using these inverted polymer solutions in various applications, including flocculation processes, centrifugation processes, dewatering of mineral slurries, settling processes. thin lift dewatering, emulsion breaking, sludge dewatering, raw water clarification, waste water clarification, drainage or retention processes in the manufacture of pulp and paper, flotation processes in mining applications, color removal, agricultural applications, municipal or industrial waste water treatment, clarification of primary or secondary industrial or municipal waste, potable water clarification, sludge composting, land application of sludge, pelletization for fertilizer application, release or recycling of clarified water, papermaking, food waste dewatering, coal refuse dewatering and thickening, tailings thickening, Bayer process applications, dewatering and clarification of fermentation broths, dewatering aqueous suspensions of dispersed solids, deinking of paper mill process water, clarification of oily waste water, clarification of food processing waste, making paper or paperboard from a cellulosic stock, soil amendment, reforestation, erosion control, seed protection or growth, other clarification processes, other thickening processes, other solid-liquid separation processes, or other processes involving dewatering of suspensions. For purposes of this disclosure, including the claims, the filter ratio (FR) can be determined using a 1.2 micron filter at 15 psi (plus or minus 10% of 15 psi) at ambient temperature (e.g., 25° C.). The 1.2 micron filter can have a diameter of 47 mm or 90 mm, and the filter ratio can be calculated as the ratio of the time for 180 to 200 ml of the inverted polymer solution to filter divided by the time for 60 to 80 ml of the inverted polymer solution to filter.

$$FR = \frac{t200 \text{ ml} - t180 \text{ ml}}{t80 \text{ ml} - t60 \text{ ml}}$$

For purposes of this disclosure, including the claims, the inverted polymer solution is required to exhibit a FR of 1.5 or less.

The inversion of conventional inverse emulsion polymers can be challenging. For use in many applications, rapid and complete inversion of the inverse emulsion polymer composition is required. For example, for many applications, rapid and continuous inversion and dissolution (e.g., complete inversion and dissolution in five minutes or less) is required. For certain applications, it can be desirable to completely invert and dissolve the emulsion or LP to a final concentration of from 500 to 5000 ppm in an in-line system in a short period of time (e.g., less than five minutes).

One test commonly used to determine performance of the emulsion or LP involves measuring the time taken for given volumes/concentrations of solution to flow through a filter, commonly called a filtration quotient or Filter Ratio ("FR"). For example, U.S. Pat. No. 8,383,560 describes a filter ratio test method which measures the time taken by given volumes of a solution containing 1000 ppm of active polymer to flow through a filter. The solution is contained in a cell pressurized to 2 bars and the filter has a diameter of 47 mm and a pore size of 5 microns. The times required to obtain 100 ml (t100 ml), 200 ml (t200 ml), and 300 ml (t300 ml) of filtrate were measured. These values were used to calculate the FR, expressed by the formula below:

$$FR = \frac{t300 \text{ ml} - t200 \text{ ml}}{t200 \text{ ml} - t100 \text{ ml}}$$

The FR generally represents the capacity of the polymer solution to plug the filter for two equivalent consecutive volumes. Generally, a lower FR indicates better performance. U.S. Pat. No. 8,383,560, which is incorporated herein by reference, explains that a desirable FR using this method is less than 1.5.

However, polymer compositions that provide desirable results using this test method, have not necessarily provided acceptable industrial performance. A modified filter ratio test method using a smaller pore size (i.e., the same filter ratio test method except that the filter above is replaced with a filter having a diameter of 47 mm and a pore size of 1.2 microns) and lower pressure (15 psi) provides a better screening method. Inverted polymer solutions prepared by the methods described herein can provide a FR using the 1.2 micron filter of 1.5 or less. The inverted compositions described herein are suitable for use in a variety of industrial applications.

LP Compositions

LP compositions can comprise one or more synthetic (co)polymers (e.g., one or more acrylamide (co)polymers) dispersed or emulsified in one or more hydrophobic liquids. In some embodiments, the LP compositions can further comprise one or more emulsifying surfactants and one or more inverting surfactants. In some embodiments, the LP compositions can further comprise a small amount of water. For example, the LP compositions can further comprise less than 10% by weight (e.g., less than 5% by weight, less than 4% by weight, less than 3% by weight, less than 2.5% by weight, less than 2% by weight, or less than 1% by weight) water, based on the total weight of all the components of the LP composition. In certain embodiments, the LP compositions can be water-free or substantially water-free (i.e., the composition can include less than 0.5% by weight water, based on the total weight of the composition). The LP compositions can optionally include one or more additional components which do not substantially diminish the desired performance or activity of the composition. It will be understood by a person having ordinary skill in the art how to appropriately formulate the LP composition to provide necessary or desired features or properties.

In some embodiments, the LP composition can comprise one or more hydrophobic liquids having a boiling point at least 100° C.; at least 39% by weight of one or more synthetic (co)polymers (e.g., acrylamide-(co)polymers); one or more emulsifier surfactants; and one or more inverting surfactants.

In some embodiments, the LP composition can comprise one or more hydrophobic liquids having a boiling point at least 100° C.; at least 39% by weight of particles of one or more acrylamide-(co)polymers; one or more emulsifier surfactants; and one or more inverting surfactants. In certain embodiments, when the composition is fully inverted in an aqueous fluid, the composition affords an inverted polymer solution having a filter ratio (FR) (1.2 micron filter) of 1.5 or less. In certain embodiments, the inverted polymer solution can comprise from about 50 to about 15,000 ppm, about 500 to about 5000 ppm (e.g., from 500 to 3000 ppm) active polymer, and have a viscosity of at least 10 cP, or at least 20 cP, at about 20 to about 40° C. In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.5 or less.

In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.5 or less.

In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.5 or less.

In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.1 to about 1.3.

In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.1 to about 1.3.

In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.1 to about 1.3.

In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.2 or less.

In exemplary embodiments, when the LP composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.2 or less.

In exemplary embodiments, when the LP is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.2 or less.

In some embodiments, the LP compositions can comprise less than 10% by weight (e.g., less than 7% by weight, less than 5% by weight, less than 4% by weight, less than 3% by weight, less than 2.5% by weight, less than 2% by weight, or less than 1% by weight) water prior to inversion, based on the total weight of all the components of the LP composition. In certain embodiments, the LP composition, prior to inversion, comprises from 1% to 10% water by weight, or from 1% to 5% water by weight, based on the total amount of all components of the composition.

In some embodiments, the solution viscosity (SV) of a 0.1% solution of the LP composition can be greater than 3.0 cP, or greater than 5 cP, or greater than 7 cP. The SV of the LP composition can be selected based, at least in part, on the intended active polymer concentration of the inverted polymer solution, to provide desired performance characteristics in the inverted polymer solution. For example, in certain embodiments, where the inverted composition is intended to have an active polymer concentration of about 2000 ppm, it is desirable that the SV of a 0.1% solution of the LP composition is in the range of from 7.0 to 8.6, because at this level, the inverted solution has desired F.R. and viscosity properties. A liquid polymer composition with a lower or higher SV range may still provide desirable results, but may require changing the active polymer concentration of the inverted composition to achieve desired F.R. and viscosity properties. For example, if the liquid polymer composition has a lower SV range, it may be desirable to increase the active polymer concentration of the inverted composition.

In some embodiments, the LP composition can comprise one or more synthetic (co)polymers (e.g., one or more acrylamide (co)polymers) dispersed in one or more hydrophobic liquids. In these embodiments, the LP composition can comprise at least 39% polymer by weight (e.g., at least 40% by weight, at least 45% by weight, at least 50% by weight, at least 55% by weight, at least 60% by weight, at least 65% by weight, at least 70% by weight, or at least 75% by weight), based on the total amount of all components of the composition. In some embodiments, the LP composition can comprise 80% by weight or less polymer (e.g., 75% by weight or less, 70% by weight or less, 65% by weight or less, 60% by weight or less, 55% by weight or less, 50% by weight or less, 45% by weight or less, or 40% by weight or less), based on the total amount of all components of the composition.

The these embodiments, the LP composition can comprise an amount of polymer ranging from any of the minimum values described above to any of the maximum values described above. For example, in some embodiments, the LP composition can comprise from 39% to 80% by weight polymer (e.g., from 39% to 60% by weight polymer, or from 39% to 50% by weight polymer), based on the total weight of the composition.

In some embodiments, the LP composition can comprise one or more synthetic (co)polymers (e.g., one or more acrylamide (co)polymers) emulsified in one or more hydrophobic liquids. In these embodiments, the LP composition can comprise at least 10% polymer by weight (e.g., at least 15% by weight, at least 20% by weight, at least 25% by weight, or at least 30% by weight), based on the total amount of all components of the composition. In some embodiments, the LP composition can comprise less than 38% by weight polymer (e.g., less than 35% by weight, less than 30% by weight, less than 25% by weight, less than 20% by weight, or less than 15% by weight), based on the total amount of all components of the composition.

The these embodiments, the LP composition can comprise an amount of polymer ranging from any of the minimum values described above to any of the maximum values described above. For example, in some embodiments, the LP composition can comprise from 10% to 38% by weight polymer (e.g., from 15% to 38% by weight polymer, from 15% to 30% by weight polymer, from 15% to 35% by weight polymer, from 20% to 30% by weight polymer, or from 20% to 35% by weight polymer), based on the total weight of the composition.

As used herein the term "up to" means that there is at least some of the referenced component.

In exemplary embodiments, the inverted polymer solution has a viscosity greater than about 10 cP at about 25° C. In exemplary embodiments, the inverted polymer solution has a viscosity in the range of about 10 cP to about 35 cP, about 15 to about 30, about 20 to about 35, or about 20 to about 30, at about 25° C. In exemplary embodiments, the inverted polymer solution has a viscosity greater than about 10 cP at about 30° C. In exemplary embodiments, the inverted polymer solution has a viscosity in the range of about 10 cP to about 30 cP, about 15 cP to about 30 cP, about 15 cP to about 25 cP, about 25 cP to about 30 cP, about 15 cP to about 22 cP, about 20 cP to about 30 cP, about 25 cP to about 35 cP at about 30° C. In exemplary embodiments, the inverted polymer solution has a viscosity greater than about 10 cP at about 40° C. In exemplary embodiments, the inverted polymer solution has a viscosity in the range of about 10 cP to about 35 cP, about 15 cP to about 35 cP, about 15 cP to about 25 cP, about 15 cP to about 22 cP, about 20 cP to about 30 cP, at about 40° C.

In exemplary embodiments, the LP compositions, when inverted in an aqueous solution, provide an inverted polymer solution having a FR1.2 of about 1.1 to about 1.4, about 1.1 to about 1.35, about 1.0 to about 1.3, or about 1.1 to about 1.3.

In exemplary embodiments, a LP composition that is inverted has an FR1.2 (1.2 micron filter) of about 1.5 or less, about 1.4 or less, about 1.3 or less, about 1.2 or less, or about 1.1 or less. In exemplary embodiments, the LP composition that is inverted has an FR5 (5 micron filter) of about 1.5 or less, about 1.4 or less, about 1.3 or less, about 1.2 or less, or about 1.1 or less. In exemplary embodiments, the LP composition that is inverted has an FR1.2 of about 1.2 or less and a FR5 of about 1.2 or less.

In exemplary embodiments, the inverted polymer solution has a FR1.2 of about 1.5 or less, about 1.4 or less, about 1.3 or less, about 1.2 or less, or about 1.1 or less. In exemplary embodiments, the inverted polymer solution has an FR5 of about 1.5 or less, about 1.4 or less, about 1.3 or less, about 1.2 or less, or about 1.1 or less. In other embodiments, the inverted polymer solution has an FR5 of about 1.5 or less, and an FR1.2 of about 1.5 or less.

Hydrophobic Liquid

In some embodiments, the LP composition can include one or more hydrophobic liquids. In some cases, the one or more hydrophobic liquids can be organic hydrophobic liquids. In some embodiments, the one or more hydrophobic liquids each have a boiling point at least 100° C. (e.g., at least 135° C., or at least 180° C.). If the organic liquid has a boiling range, the term "boiling point" refers to the lower limit of the boiling range.

In some embodiments, the one or more hydrophobic liquids can be aliphatic hydrocarbons, aromatic hydrocarbons, or mixtures thereof. Examples of hydrophobic liquids include but are not limited to water-immiscible solvents, such as paraffin hydrocarbons, naphthene hydrocarbons, aromatic hydrocarbons, olefins, oils, stabilizing surfactants, and mixtures thereof. The paraffin hydrocarbons can be saturated, linear, or branched paraffin hydrocarbons. Examples of suitable aromatic hydrocarbons include, but are not limited to, toluene and xylene. In certain embodiments, the hydrophobic liquid can comprise an oil, for example, a vegetable oil, such as soybean oil, rapeseed oil, canola oil, or a combination thereof, and any other oil produced from the seed of any of several varieties of the rape plant.

In some embodiments, the amount of the one or more hydrophobic liquids in the inverse emulsion or LP composition is from 20% to 60%, from 25% to 54%, or from 35% to 54% by weight, based on the total amount of all components of the LP composition.

Synthetic (Co)Polymers

In some embodiments, the LP composition includes one or more synthetic (co)polymers, such as one or more acrylamide containing (co)polymers. As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

In some embodiments, the one or more synthetic (co)polymers comprise water-soluble synthetic (co)polymers. Examples of suitable synthetic (co)polymers include acrylic polymers, such as polyacrylic acids, polyacrylic acid esters, partly hydrolyzed acrylic esters, substituted polyacrylic acids such as polymethacrylic acid and polymethacrylic acid esters, polyacrylamides, partly hydrolyzed polyacrylamides, and polyacrylamide derivatives such as acrylamide tertiary butyl sulfonic acid (ATBS); copolymers of unsaturated carboxylic acids, such as acrylic acid or methacrylic acid, with olefins such as ethylene, propylene and butylene and their oxides; polymers of unsaturated dibasic acids and anhydrides such as maleic anhydride; vinyl polymers, such as polyvinyl alcohol (PVA), N-vinylpyrrolidone, and polystyrene sulfonate; and copolymers thereof, such as copolymers of these polymers with monomers such as ethylene, propylene, styrene, methylstyrene, and alkylene oxides. In some embodiments, the one or more synthetic (co)polymer can comprise polyacrylic acid (PAA), polyacrylamide (PAM), acrylamide tertiary butyl sulfonic acid (ATBS) (or AMPS: 2-Acrylamido-2-methylpropane sulfonic acid), N-vinylpyrrolidone (NVP), polyvinyl alcohol (PVA), or a blend or copolymer of any of these polymers. Copolymers may be made of any combination above, for example, a combination of NVP and ATBS.

In some embodiments, the one or more synthetic (co) polymers can comprise acrylamide (co)polymers. In some embodiments, the one or more acrylamide (co)polymers comprise water-soluble acrylamide (co)polymers. In various embodiments, the acrylamide (co)polymers comprise at least 30% by weight, or at least 50% by weight acrylamide units with respect to the total amount of all monomeric units in the (co)polymer.

Optionally, the acrylamide-(co)polymers can comprise, besides acrylamide, at least one additional monomer. In some embodiments, the additional monomer can be a water-soluble, ethylenically unsaturated, in particular monoethylenically unsaturated, monomer. Suitable additional water-soluble monomers include monomers that are miscible with water in any ratio, but it is sufficient that the monomers dissolve sufficiently in an aqueous phase to copolymerize with acrylamide. In some cases, the solubility of such additional monomers in water at room temperature can be at least 50 g/L (e.g., at least 150 g/L, or at least 250 g/L).

Other suitable water-soluble monomers can comprise one or more hydrophilic groups. The hydrophilic groups can be, for example, functional groups that comprise one or more atoms selected from the group of O-, N-, S-, and P-atoms. Examples of such functional groups include carbonyl groups >C—O, ether groups —O—, in particular polyethylene oxide groups —$(CH_2—CH_2—O—)_n$—, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —$SO_3H$, phosphonic acid groups —$PO_3H_2$ or phosphoric acid groups —$OP(OH)_3$.

Examples of monoethylenically unsaturated monomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkyl-phosphonic acids. Of course the monomers may be used as salts.

The —COOH groups in polyacrylamide-copolymers may not only be obtained by copolymerizing acrylic amide and monomers comprising —COOH groups but also by hydrolyzing derivatives of —COOH groups after polymerization. For example, the amide groups —$CO—NH_2$ of acrylamide may hydrolyze thus yielding —COOH groups.

Also to be mentioned are derivatives of acrylamide thereof, such as, for example, N-alkyl acrylamides and N-alkyl quaternary acrylamides, where the alkyl group is C2-C28; N-methyl(meth)acrylamide, N,N'-dimethyl(meth)acrylamide, and N-methylolacrylamide; N-vinyl derivatives such as N-vinylformamide, N-vinylacetamide, N-vinylpyrrolidone or N-vinylcaprolactam; and vinyl esters, such as vinyl formate or vinyl acetate. N-vinyl derivatives can be hydrolyzed after polymerization to vinylamine units, vinyl esters to vinyl alcohol units.

Other example monomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide(meth)acrylates.

Other example monomers are monomers having ammonium groups, i.e. monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

Other example monomers include monomers which may cause hydrophobic association of the (co)polymers. Such monomers comprise besides the ethylenic group and a hydrophilic part also a hydrophobic part. Such monomers are disclosed for instance in WO 2012/069477, which is incorporated herein by reference in its entirety.

In certain embodiments, each of the one or more acrylamide-(co)polymers can optionally comprise crosslinking monomers, i.e. monomers comprising more than one polymerizable group. In certain embodiments, the one or more acrylamide-(co)polymers may optionally comprise crosslinking monomers in an amount of less than 0.5%, or 0.1%, by weight, based on the amount of all monomers.

In an embodiment, each of the one or more acrylamide-(co)polymers comprises at least one monoethylenically unsaturated monomer comprising acid groups, for example monomers which comprise at least one group selected from —COOH, —$SO_3H$ or —$PO_3H_2$. Examples of such monomers include but are not limited to acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. The amount of such monomers comprising acid groups can be from 0.1% to 70%, from 1% to 50%, or from 10% to 50% by weight based on the amount of all monomers.

In an embodiment, each of the one or more acrylamide-(co)polymers comprise from 50% to 90% by weight of acrylamide units and from 10% to 50% by weight of acrylic acid units and/or their respective salts, based on the total weight of all the monomers making up the copolymer. In an embodiment, each of the one or more acrylamide-(co)polymers comprise from 60% to 80% by weight of acrylamide units and from 20% to 40% by weight of acrylic acid units, based on the total weight of all the monomers making up the co-polymer.

In some embodiments, the one or more synthetic (co)polymers (e.g., the one or more acrylamide (co)polymers) are in the form of particles, which are dispersed in the emulsion or LP. In some embodiments, the particles of the one or more synthetic (co)polymers can have an average particle size of from 0.4 µm to 5 µm, or from 0.5 µm to 2 µm. Average particle size refers to the $d_{50}$ value of the particle size distribution (number average) as measured by laser diffraction analysis.

In some embodiments, the one or more synthetic (co)polymers (e.g., the one or more acrylamide (co)polymers) can have a weight average molecular weight ($M_w$) of from 5,000,000 g/mol to 30,000,000 g/mol; from 10,000,000 g/mol to 25,000,000 g/mol; or from 15,000,000 g/mol to 25,000,000 g/mol.

In some embodiments, the LP composition can comprise one or more synthetic (co)polymers (e.g., one or more acrylamide (co)polymers) dispersed in one or more hydrophobic liquids. In these embodiments, the amount of the one or more synthetic (co)polymers (e.g., one or more acrylamide (co)polymers) in the LP composition can be at least 39% by weight, based on the total weight of the composition. In some of these embodiments, the amount of the one or more synthetic (co)polymers (e.g., one or more acrylamide-(co)polymers) in the LP composition can be from 39% to 80% by weight, or from 40% to 60% by weight, or from 45% to 55% by weight, based on the total amount of all components of the composition (before dilution). In some embodiments, the amount of the one or more synthetic (co)polymers (e.g., one or more acrylamide-(co)polymers) in the LP composition is 39%, 40%, 41%, 42%, 43%, 44%, 45%, 46%, 47%, 48%, 49%, 50%, 51%, 52%, 53%, 54%, 55%, 56%, 57%, 58%, 59%, 60%, or higher, by weight, based on the total amount of all components of the composition (before dilution).

In some embodiments, the LP composition can comprise one or more synthetic (co)polymers (e.g., one or more acrylamide (co)polymers) emulsified in one or more hydrophobic liquids. In these embodiments, the amount of the one or more synthetic (co)polymers (e.g., one or more acrylamide (co)polymers) in the LP composition can be less than 35% by weight, or less than 30% by weight based on the total weight of the composition. In some of these embodiments, the amount of the one or more synthetic (co)polymers (e.g., one or more acrylamide-(co)polymers) in the LP composition can be from 10% to 35% by weight, or from 15% to 30% by weight, or from 20% to 30% by weight, based on the total amount of all components of the composition (before dilution). In some embodiments, the amount of the one or more synthetic (co)polymers (e.g., one or more acrylamide-(co)polymers) in the LP composition is 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, or less, by weight, based on the total amount of all components of the composition (before dilution).

Emulsifying Surfactants

In some embodiments, the LP composition can include one or more emulsifying surfactants. In some embodiments, the one or more emulsifying surfactants are surfactants capable of stabilizing water-in-oil-emulsions. Emulsifying surfactants, among other things, in the emulsion, lower the interfacial tension between the water and the water-immiscible liquid so as to facilitate the formation of a water-in-oil polymer emulsion. It is known in the art to describe the capability of surfactants to stabilize water-in-oil-emulsions or oil-in-water emulsions by using the so called "HLB-value" (hydrophilic-lipophilic balance). The HLB-value usually is a number from 0 to 20. In surfactants having a low HLB-value the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. In some embodiments, the one or more emulsifying surfactants are surfactants having an HLB-value of from 2 to 10, or a mixture of surfactant having an HLB-value of from 2 to 10.

Examples of suitable emulsifying surfactants include, but are not limited to, sorbitan esters, in particular sorbitan monoesters with C12-C18-groups such as sorbitan monolaurate (HLB approx. 8.5), sorbitan monopalmitate (HLB approx. 7.5), sorbitan monostearate (HLB approx. 4.5), sorbitan monooleate (HLB approx. 4); sorbitan esters with more than one ester group such as sorbitan tristearate (HLB approx. 2), sorbitan trioleate (HLB approx. 2); ethoxylated fatty alcohols with 1 to 4 ethyleneoxy groups, e.g. polyoxyethylene (4) dodecylether ether (HLB value approx. 9), polyoxyethylene (2) hexadecyl ether (HLB value approx. 5), and polyoxyethylene (2) oleyl ether (HLB value approx. 4).

Exemplary emulsifying surfactants include, but are not limited to, emulsifiers having HLB values of from 2 to 10 (e.g., less than 7). Suitable such emulsifiers include the sorbitan esters, phthalic esters, fatty acid glycerides, glycerine esters, as well as the ethoxylated versions of the above and any other well-known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier can be utilized which will permit the formation of the initial emulsion and stabilize the emulsion during the polymerization reaction. Examples of emulsifying surfactants also include modified polyester surfactants, anhydride substituted ethylene copolymers, N,N-dialkanol substituted fatty amides, and tallow amine ethoxylates.

In an embodiment, the inverse emulsion or LP composition comprises from 0% to 5% by weight (e.g., from 0.05% to 5%, from 0.1% to 5%, or from 0.5% to 3% by weight) of the one or more emulsifying surfactants, based on the total weight of the composition. These emulsifying surfactants can be used alone or in mixtures. In some embodiments, the inverse emulsion or LP composition can comprise less than 5% by weight (e.g., less than 4% by weight, or less than 3% by weight) of the one or more emulsifying surfactants, based on the total weight of the composition.

Process Stabilizing Agent

In some embodiments, the LP composition can optionally include one or more process stabilizing agents. The process stabilizing agents aim at stabilizing the dispersion of the particles of polyacrylamide-(co)polymers in the organic, hydrophobic phase and optionally also at stabilizing the droplets of the aqueous monomer phase in the organic hydrophobic liquid before and in course of the polymerization or processing of the liquid polymer composition. The term "stabilizing" means in the usual manner that the agents prevent the dispersion from aggregation and flocculation.

The process stabilizing agents can be any stabilizing agents, which include surfactants, which aim at such stabilization. In one exemplary embodiment, the process stabilizing agent can be oligomeric or polymeric surfactants. Due to the fact that oligomeric and polymeric surfactants can have many anchor groups they absorb very strongly on the surface of the particles and furthermore oligomers/polymers are capable of forming a dense steric barrier on the surface of the particles which prevents aggregation. The number average molecular weight Mn of such oligomeric or polymeric surfactants may for example range from 500 to 60,000 g/mol (e.g., from 500 to 10,000 g/mol, or from 1,000 to 5,000 g/mol). Suitable oligomeric and/or polymeric surfactants for stabilizing polymer dispersions are known to the skilled artisan. Examples of such stabilizing polymers include, without limitation, comprise amphiphilic block copolymers, comprising hydrophilic and hydrophobic blocks, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic block copolymers include block copolymers comprising a hydrophobic block comprising alkylacrylates having longer alkyl chains, e.g., C6 to C22-alkyl chains, such as for instance hexyl(meth)acrylate, 2-ethylhexyl(meth)acrylate, octyl(meth)acrylate, do-decyl(meth)acrylate, hexadecyl(meth)acrylate or octadecyl(meth)acrylate. The hydrophilic block may comprise hydrophilic monomers such as acrylic acid, methacrylic acid or vinyl pyrrolidone.

Inverting Surfactants In some embodiments, the LP composition optionally can include one or more inverting surfactants. In some embodiments, the one or more emulsifying surfactants are surfactants which can be used to accelerate the formation of an inverted composition (e.g., an inverted (co)polymer solution) after mixing the inverse emulsion or LP composition with an aqueous fluid.

Suitable inverting surfactants are known in the art, and include, for example, nonionic surfactants comprising a hydrocarbon group and a polyalkylenoxy group of sufficient hydrophilic nature. In some cases, nonionic surfactants defined by the general formula $R^1$—O—$(CH(R^2))$—$CH_2$—O)$_n$H, (I) can be used, wherein $R^1$ is a $C_8$-$C_{22}$-hydrocarbon group, such as an aliphatic $C_{10}$-$C_{18}$-hydrocarbon group, n is a number of preferably and $R^2$ is H, methyl or ethyl, with the proviso that at least 50% of the groups $R^2$ are H. Examples of such surfactants include polyethoxylates based on $C_{10}$-$C_{18}$-alcohols such as $C_{12/14}$-, $C_{14/18}$- or $C_{16/18}$-fatty alcohols, $C_{13}$- or $C_{13/15}$-oxoalcohols. The HLB-value can be adjusted by selecting the number of ethoxy groups. Specific examples include tridecylalcohol ethoxylates comprising from 4 to 14 ethylenoxy groups (e.g., tridecyalcohol-8 EO (HLB-value approx. 13-14)) or $C_{12/14}$ fatty alcohol ethoxylates (e.g., $C_{12/14}$·8 EO (HLB-value approx. 13)). Examples of emulsifying surfactants also include modified polyester surfactants, anhydride substituted ethylene copolymers, N,N-dialkanol substituted fatty amides, and tallow amine ethoxylates.

Other suitable inverting surfactants include anionic surfactants, such as, for example, surfactants comprising phosphate or phosphonic acid groups.

In some embodiments, the one or more inverting surfactants can comprise polyoxyethylene sorbitol tetraoleate, $C_{12}$-$_{14}$ branched ethoxylated alcohol, polyethylene glycol monoleate. In certain embodiments, the one or more inverting surfactants can comprise from 1 to 20 mole % polyoxyethylene sorbitol tetraoleate, from 60 to 80 mole % $C_{12}$-$_{14}$ branched ethoxylated alcohol and about 15 to about 25 mole % polyethylene glycol monoleate.

In some embodiments, the amount of the one or more inverting surfactants in the inverse emulsion or LP composition is from 1% to 10% (e.g., from 1% to 5%) by weight. Based on the total amount of all components of the inverse emulsion or LP composition.

In certain embodiments, the one or more inverting surfactants can be added to the inverse emulsion or LP composition directly after preparation of the composition comprising the one or more acrylamide (co)polymers dispersed in one or more hydrophobic liquids, and optionally the one or more emulsifying surfactants (i.e., the inverse emulsion or liquid dispersion polymer composition which is transported from the location of manufacture to the location of use already comprises the one or more inverting surfactants). In another embodiment the one or more inverting surfactants may be added to the inverse emulsion or LP composition at the location of use (e.g., at an off-shore production site).

Other Components

Optional further components can be added to the inverse emulsion or LP composition. Examples of such components comprise radical scavengers, oxygen scavengers, chelating agents, biocides, stabilizers, or sacrificial agents.

Preparation of LP Compositions

LP compositions can be synthesized as according to the following procedures.

In a first step, an inverse emulsion (water-in-oil emulsion) of acrylamide-(co)polymers can be synthesized using procedures known to the skilled artisan. Such inverse emulsions can be obtained by polymerizing an aqueous solution of acrylamide and other monomers, such as water-soluble ethylenically unsaturated monomers, emulsified in a hydrophobic oil phase. In a following step, water within such inverse emulsions can be reduced to an amount of less than 10%, or less than 5%, by weight. Suitable techniques are described for instance in U.S. Pat. Nos. 4,052,353, 4,528, 321, or DE 24 19 764 A1, each of which is incorporated herein by reference in its entirety.

For the polymerization, an aqueous monomer solution comprising acrylamide and optionally other monomers can be prepared. Acrylamide is a solid at room temperature and aqueous solutions comprising around 50% by weight of acrylamide are commercially available. If monomers with acidic groups such as acrylic acid are used the acidic groups may be neutralized by adding aqueous bases such as aqueous sodium hydroxide. The concentration of all monomers together in the aqueous solution should usually be from 10% to 60% by weight based on the total of all components of the monomer solution, or from 30% to 50%, or from 35% to 45% by weight.

The aqueous solution of acrylamide and monomers can be emulsified in the one or more hydrophobic liquids using one or more emulsifying surfactants. The one or more emulsifying surfactants may be added to the mixture or may be added before to the monomer solution or the hydrophobic liquid. Other surfactants may be used in addition to the one or more emulsifying surfactants, such as a stabilizing surfactant. Emulsifying may be done in the usual manner, e.g. by stirring the mixture.

After an emulsion has been formed polymerization may be initiated by adding oil- and/or water soluble initiators for radical polymerization to the emulsion. The initiators may be dissolved in water or water miscible organic solvents such as for instance alcohols. It may also be added as emulsion. Exemplary polymerization initiators comprise organic peroxides such as tert-butyl hydroperoxide, sodium sulfite, sodium disulfite or organic sulfites, ammonium- or sodium peroxodisulfate, iron(II) salts or azo groups comprising initiators such as AIBN.

In certain embodiments, one or more chain transfer agents may be added to the mixture during polymerization. Generally, chain transfer agents have at least one weak chemical bond, which therefore facilitates the chain transfer reaction. Any conventional chain transfer agent may be employed, such as propylene glycol, isopropanol, 2-mercaptoethanol, sodium hypophosphite, dodecyl mercaptan, thioglycolic acid, other thiols and halocarbons, such as carbon tetrachloride. The chain transfer agent is generally present in an amount of from 0.001 percent to 10 percent by weight of the total emulsion, though more may be used.

The polymerization temperature usually is from 30° C. to 100° C., or from 30° C. to 70° C., or from 35° C. to 60° C. Heating may be done by external sources of heat and/or heat may be generated—in particular when starting polymerization—by the polymerization reaction itself. Polymerization times may for example be from about 0.5 h to about 10 h.

The polymerization yields an inverse emulsion comprising an aqueous phase of the one or more acrylamide-(co)polymers dissolved or swollen in water wherein the aqueous phase is emulsified in an organic phase comprising the one or more hydrophobic liquids.

In various exemplary embodiments, the one or more process stabilizing agents may be added to the LP composition. In exemplary embodiments, the process stabilizing agent may be added to the monomer solution or the hydrophobic liquid before mixing. In other exemplary embodiments, the process stabilizing agent may be added to the liquid polymer composition after polymerization. In order to convert the inverse emulsion obtained to the LP compositions to be used in the methods described herein, after the polymerization, some or all of the water is distilled off from the emulsion thus yielding particles of the one or more acrylamide-(co)polymers emulsified in the one or more hydrophobic liquids.

For the liquid polymer compositions, the water is at least removed to a level of less than 10%, or less than 7%, or less than 5%, or less than 3% by weight. In exemplary embodiments, the removal of water is carried out by any suitable means, for example, at reduced pressure, e.g. at a pressure of 30 hPa to 500 hPa, preferably 50 hPa to 250 hPa. The temperature in course of water removal may typically be from 70° C. to 100° C., although techniques which remove water at higher temperatures may be used. In certain embodiments, one or more of the hydrophobic liquids used in the inverse emulsion may be a low boiling liquid, which may distill off together with the water as a mixture.

After removal of the amount of water desired, the one or more inverting surfactants, and other optional components, can be added.

In some embodiments, the manufacture of the liquid polymer compositions is carried out in a chemical production plant.

Inverted Polymer Solutions

Also provided herein are inverted polymer solutions, as well as methods of preparing the inverted polymer solutions from the LP compositions described herein and methods for using the inverted polymer solutions in oil and gas operations.

Methods for preparing inverted polymer solutions from the LP compositions described herein can comprise inverting the LP composition in an aqueous fluid to provide an inverted polymer solution having an active polymer concentration of one or more synthetic (co)polymers (e.g., one or more acrylamide (co)polymers) of from 50 to 15,000 ppm.

In some embodiments, the inverted polymer solution can have an active polymer concentration of one or more synthetic (co)polymers (e.g., one or more acrylamide (co)polymers) of at least 50 ppm (e.g., at least 100 ppm, at least 250 ppm, at least 500 ppm, at least 750 ppm, at least 1000 ppm, at least 1500 ppm, at least 2000 ppm, at least 2500 ppm, at least 3000 ppm, at least 3500 ppm, at least 4000 ppm, at least 4500 ppm, at least 5000 ppm, at least 5500 ppm, at least 6000 ppm, at least 6500 ppm, at least 7000 ppm, at least 7500 ppm, at least 8000 ppm, at least 8500 ppm, at least 9000 ppm, at least 9500 ppm, at least 10,000 ppm, at least 10,500 ppm, at least 11,000 ppm, at least 11,500 ppm, at least 12,000 ppm, at least 12,500 ppm, at least 13,000 ppm, at least 13,500 ppm, at least 14,000 ppm, or at least 14,500 ppm).

In some embodiments, the inverted polymer solution can have an active polymer concentration of one or more synthetic (co)polymers (e.g., one or more acrylamide (co)polymers) of 15,000 ppm or less (e.g., 14,500 ppm or less, 14,000 ppm or less, 13,500 ppm or less, 13,000 ppm or less, 12,500 ppm or less, 12,000 ppm or less, 11,500 ppm or less, 11,000 ppm or less, 10,500 ppm or less, 10,000 ppm or less, 9,500 ppm or less, 9,000 ppm or less, 8,500 ppm or less, 8,000 ppm or less, 7,500 ppm or less, 7,000 ppm or less, 6,500 ppm or less, 6,000 ppm or less, 5,500 ppm or less, 5,000 ppm or less, 4500 ppm or less, 4000 ppm or less, 3500 ppm or less, 3000 ppm or less, 2500 ppm or less, 2000 ppm or less, 1500 ppm or less, 1000 ppm or less, 750 ppm or less, 500 ppm or less, 250 ppm or less, or 100 ppm or less).

The inverted polymer solution can have an active polymer concentration of one or more synthetic (co)polymers (e.g., one or more acrylamide (co)polymers) ranging from any of the minimum values described above to any of the maximum values described above. For example, in some embodiments, the inverted polymer solution can have an active polymer concentration of one or more synthetic (co)polymers (e.g., one or more acrylamide (co)polymers) of from 500 to 5000 ppm (e.g., from 500 to 3000 ppm, or from 500 to 1500 Ppm).

In some embodiments, the inverted polymer solution can be an aqueous unstable colloidal suspension. In other embodiments, the inverted polymer solution can be an aqueous stable solution.

In some embodiments, the inverted polymer solution can have a filter ratio of 1.5 or less (e.g., 1.45 or less, 1.4 or less, 1.35 or less, 1.3 or less, 1.25 or less, 1.2 or less, 1.15 or less, 1.1 or less, or less than 1.05) at 15 psi using a 1.2 μm filter. In some embodiments, the inverted polymer solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 μm filter.

The inverted polymer solution can have a filter ratio at 15 psi (+/−10%) using a 1.2 μm filter ranging from any of the minimum values described above to any of the maximum values described above. For example, in some embodiments, the inverted polymer solution can have a filter ratio of from 1 to 1.5 (e.g., from 1.1 to 1.4, or from 1.1 to 1.3) at 15 psi (+/−10%) using a 1.2 μm filter.

In certain embodiments, the inverted polymer solution can have a viscosity based on shear rate, temperature, salinity, polymer concentration, and polymer molecular weight. In some embodiments, the inverted polymer solution can have a viscosity of from 2 cP to 100 cP, where the 2 cP to 100 cP is an output using the ranges in the following table:

| | |
|---|---|
| Polymer viscosity (cP) | 2~100 |
| Shear rate (1/sec) | 0.1~1000 |
| Temperature (° C.) | 1~120 |
| Salinity (ppm) | 0~250,000 |
| Polymer concentration (ppm) | 50~15,000 |
| Polymer molecular weight (Dalton) | 2M~26M |

In some embodiments, the inverted polymer solution can have a viscosity of from 25cP to 35cP at 30° C. In some embodiments, the inverted polymer solution can have a viscosity of greater than 10cP at 40° C. In certain embodiments, the inverted polymer solution can have a viscosity of from 20 cP to 30 cP at 40° C.

In some embodiments, when the LP composition is inverted in an aqueous fluid, providing an inverted polymer solution having from 50 to 15,000 ppm, from 500 to 5,000 ppm, or from 500 to 3000 ppm, active polymer, the inverted polymer solution has a viscosity of at least 20 cP at 40° C., and a filter ratio (FR) (1.2 micron filter) of 1.5 or less. In certain embodiments, when the LP composition is inverted in an aqueous fluid, providing an inverted polymer solution having from 50 to 15,000 ppm, from 500 to 5000 ppm, or from 500 to 3000 ppm, active polymer, the inverted polymer solution has a viscosity of at least 20 cP at 30° C., and a filter ratio (FR) (1.2 micron filter) of 1.5 or less. As used herein, "inverted" refers to the point at which the viscosity of the inverted polymer solution has substantially reached a consistent viscosity. In practice, this may be determined for example by measuring viscosity of the inverted polymer solution periodically over time and when three consecutive measurements are within the standard of error for the measurement, then the composition is considered inverted. In some embodiments, inversion of the LP forms the inverted polymer solution in 30 minutes or less (e.g., 15 minutes or less, 10 minutes or less, 5 minutes or less, or less).

As described above, methods for preparing an inverted polymer solution from the LP composition described herein can comprise inverting the LP composition in an aqueous fluid to provide an inverted polymer solution having an active polymer concentration of acrylamide (co)polymer of from 50 to 15,000 ppm. Inversion of the LP composition can be performed as a batch process or a continuous process. In certain embodiments, inversion of the LP composition can be performed as a continuous process. A continuous process is a process that can be effected without the need to be intermittently stopped or slowed. For example, continuous processes can meet one or more of the following criteria: (a) materials for forming the inverted polymer solution (e.g., the LP composition and the aqueous fluid) are fed into the system in which the inverted polymer solution is produced at the same rate as the inverted polymer solution is removed from the system; (b) the nature of the composition(s) introduced to the system in which the inverted polymer solution is produced is a function of the composition(s) position with the process as it flows from the point at which the composition(s) are introduced to the system to the point at which the inverted polymer solution is removed from the system; and/or (c) the quantity of inverted polymer solution produced is a function of (i) the duration for which the process is operated and (ii) the throughput rate of the process.

Inversion of the LP composition can comprise a single step, or a plurality of steps (i.e., two or more steps). In some embodiments, inversion of the LP composition can be performed in a single step. In these embodiments, the LP composition (e.g., a composition having at least 39% (e.g., 39% or more) by weight of one or more synthetic (co) polymers (e.g., one or more acrylamide (co)polymers) dispersed in a hydrophobic liquid, or a composition having up to 35% (e.g., less than 35%) by weight of one or more synthetic (co)polymers (e.g., one or more acrylamide (co) polymers) emulsified in a hydrophobic liquid) can be inverted in an aqueous fluid to provide an inverted polymer solution having an active polymer concentration of one or more synthetic (co)polymers (e.g., one or more acrylamide (co)polymers) of from 50 to 15,000 ppm.

The single inversion step can comprise diluting the LP composition in the aqueous fluid in an in-line mixer to provide the inverted polymer solution. For example, a polymer feed stream comprising the LP composition can be combined (e.g., in a fixed ratio) with an aqueous fluid stream upstream of an in-line mixer. The combined fluid stream can then pass through the in-line mixer, emerging as the inverted polymer solution. In some embodiments, the in-line mixer can have a mixer inlet and a mixer outlet, and the difference in pressure between the mixer inlet and the mixer outlet is from 15 psi to 400 psi (e.g., from 15 psi to 150 psi, from 15 psi to 100 psi, or from 15 psi to 75 psi).

An example system for inversion of LP compositions in a single step is illustrated schematically in FIG. 1. As shown in FIG. 1, a pump 102 can be used to inject a stream of the LP composition 104 into a line 106 carrying the aqueous fluid stream. The combined fluid stream can then pass through an in-line mixer 108 having a mixer inlet 110 and a mixer outlet 112, emerging as the inverted polymer solution. The pressure drop through the in-line mixer 108 ($\Delta p$) can be from 15 psi to 400 psi (e.g., from 15 psi to 150 psi, from 15 psi to 100 psi, or from 15 psi to 75 psi).

In other embodiments, inversion of the LP composition can be performed in two or more steps (e.g., an inversion step in which the LP composition is inverted in the aqueous fluid to form a concentrated polymer composition having an active polymer concentration of up to 15,000 ppm; and one or more dilution steps in which the concentrated polymer composition is diluted in the aqueous fluid to provide the inverted polymer solution. For example, inversion of the LP composition can be performed in two, three, four, five, or more consecutive steps. In certain cases, inversion of the LP composition can be performed in two steps. In these embodiments, inversion of the LP can comprise as a first step, inverting the LP composition in an aqueous fluid in a first in-line mixer having a first mixer inlet and a first mixer outlet to provide an inverted polymer solution with an active polymer concentration of synthetic (co)polymer that is up to 15,000 ppm (e.g., from 5,000 to 15,000 ppm); and as a second step, diluting the inverted polymer solution in the aqueous fluid in a second in-line mixer having a second mixer inlet and a second mixer outlet to provide the inverted polymer solution.

For example, a polymer feed stream comprising the LP composition can be combined (e.g., in a fixed ratio) with an aqueous fluid stream upstream of a first in-line mixer. The combined fluid stream can then pass through the first in-line mixer, emerging as an inverted polymer solution with an active polymer concentration of synthetic (co)polymer that is up to 15,000 ppm (e.g., from 5,000 to 15,000 ppm). The fluid stream can then be combined (e.g., in a fixed ratio) with a second aqueous fluid stream upstream of a second in-line mixer. The combined fluid stream can then pass through the second in-line mixer, emerging as the inverted polymer solution. In some embodiments, the first in-line mixer can have a first mixer inlet and a first mixer outlet, and the difference in pressure between the first mixer inlet and the first mixer outlet can be from 15 psi to 400 psi (e.g., from 15 psi to 150 psi, from 15 psi to 100 psi, or from 15 psi to 75 psi). In some embodiments, the second in-line mixer can have a second mixer inlet and a second mixer outlet, and the difference in pressure between the second mixer inlet and the second mixer outlet can be from 15 psi to 400 psi (e.g., from 15 psi to 150 psi, from 15 psi to 100 psi, or from 15 psi to 75 psi).

Figure 2:
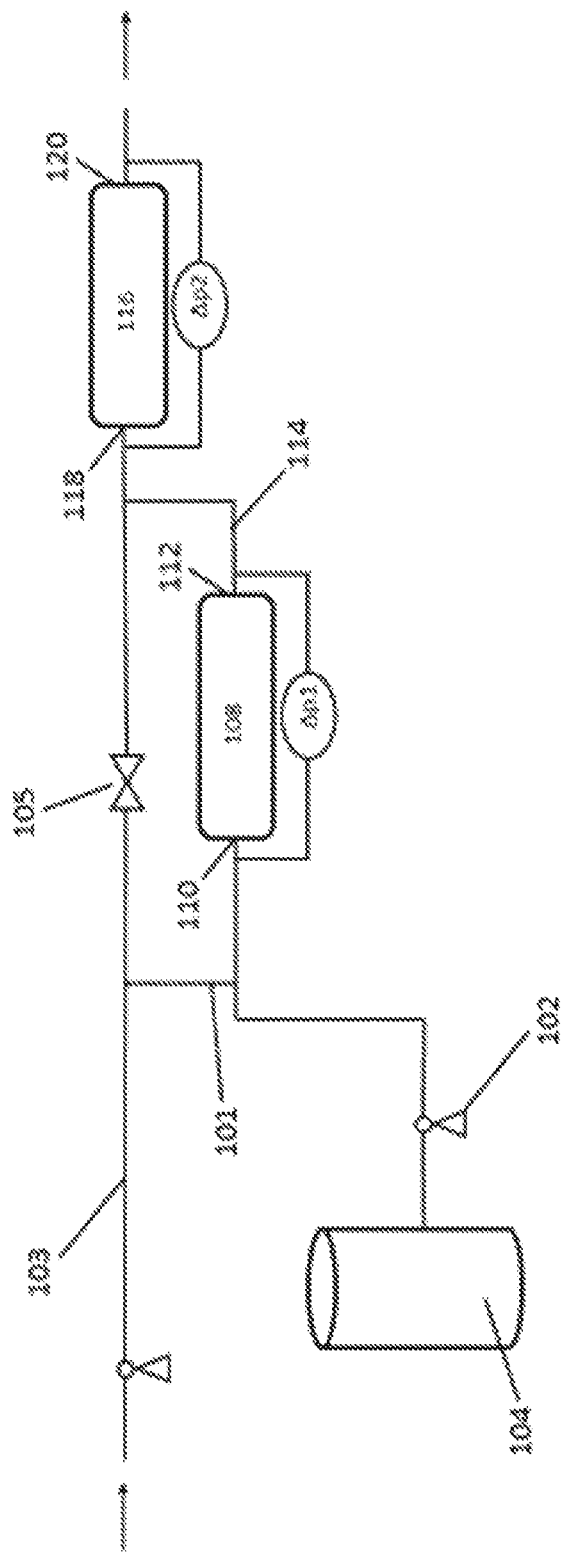
FIG. 2 is a process flow diagram illustrating a two-step process for preparing an inverted polymer solution.

An example system for inversion of LP compositions in two steps is illustrated schematically in FIG. 2. As shown in FIG. 2, a pump 102 can be used to inject a stream of the LP composition 104 into bypass 101 mounted on main line 103 carrying the aqueous fluid stream. A valve 105 positioned on main line 103 downstream of bypass 101 can be used to direct aqueous fluid flow through bypass 101. The combined fluid stream can then pass through a first in-line mixer 108 having a first mixer inlet 110 and a first mixer outlet 112, emerging as the inverted polymer solution with an active polymer concentration of synthetic (co)polymer that is up to 15,000 ppm (e.g., from 5,000 to 15,000 ppm). The pressure drop through the first in-line mixer 108 ($\Delta p1$) can be from 15 psi to 400 psi (e.g., from 15 psi to 150 psi, from 15 psi to 100 psi, or from 15 psi to 75 psi). The inverted polymer fluid stream 114 can then be combined (e.g., in a fixed ratio) with the aqueous fluid stream in main line 103 upstream of a second in-line mixer 116. The combined fluid stream can then pass through a second in-line mixer 116 having a second mixer inlet 118 and a second mixer outlet 120, emerging as the inverted polymer solution. The pressure drop through the second in-line mixer 116 ($\Delta p2$) can be from 15 psi to 400 psi (e.g., from 15 psi to 150 psi, from 15 psi to 100 psi, or from 15 psi to 75 psi).

The LP compositions described herein can also be inverted using inversion methods and systems known in the art, such as those described in U.S. Pat. No. 8,383,560, which is hereby incorporated by reference in its entirety.

Figure 3A:
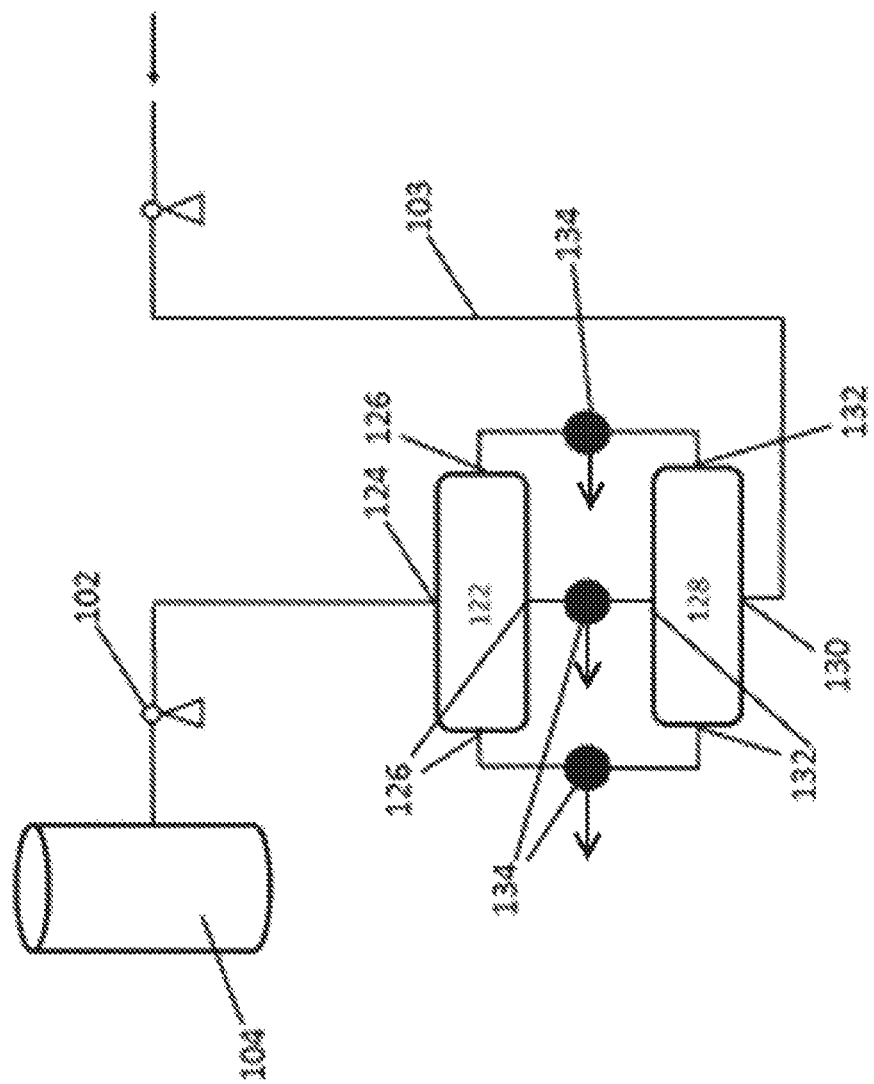
FIG. 3 is a process flow diagram illustrating a plurality of processes for preparing inverted polymer solutions.
Figure 3B:
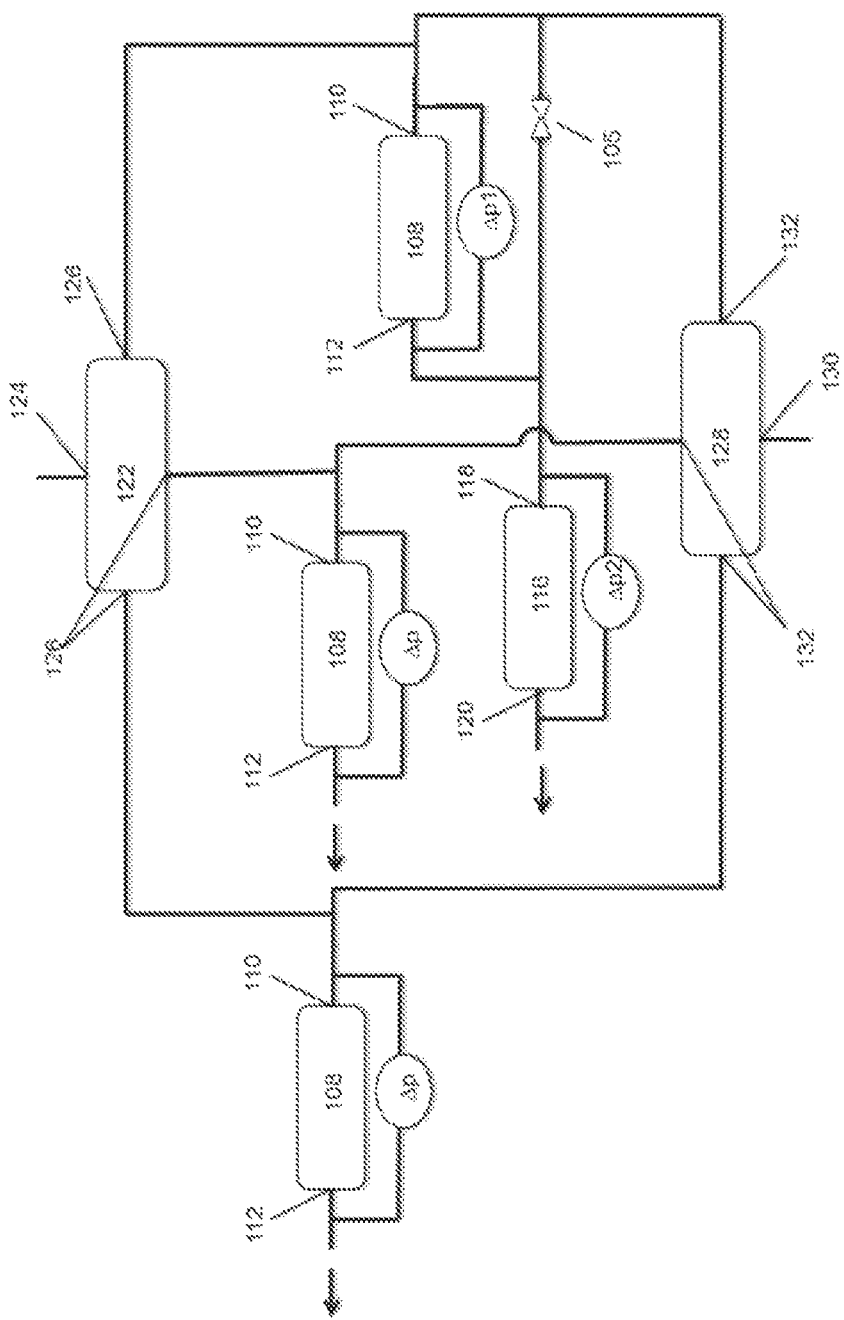

Another example system for inversion of LP compositions is illustrated schematically in FIG. 3. As shown in FIG. 3A, a pump 102 can be used to direct a stream of the LP composition 104 to LP manifold 122. LP manifold 122 can include an LP manifold inlet 124 through which the LP composition enters the LP manifold 122, and a plurality of LP manifold outlets 126 (in this example three manifold outlets) through which streams of the LP composition exit the LP manifold 122. The system can also include a main line 103 carrying an aqueous fluid stream to aqueous fluid manifold 128. The aqueous fluid manifold 128 can include an aqueous fluid manifold inlet 130 through which the aqueous fluid enters the aqueous fluid manifold 128, and a plurality of aqueous fluid manifold outlets 132 (in this example three manifold outlets) through which streams of the aqueous fluid exit the aqueous fluid manifold 128. Each stream of LP composition exiting LP manifold 122 can then be combined with a stream of aqueous fluid exiting the aqueous fluid manifold 128 in a different configuration of in-line mixers 134, thereby forming a plurality of streams of the inverted polymer solution in parallel. The configuration of in-line mixers 134 for inversion of the LP composition comprises parallel single steps, parallel multiple steps, or any combination thereof. FIG. 3B shows one example of configuration of the in-line mixers 134 comprises the combination of two single steps and one two-step of inversion process in parallel.

Any suitable in-line mixer(s) can be used in conjunction with the inversion methods described above. The in-line mixer can be a dynamic mixer or a static mixer. Suitable dynamic mixers, which involve mechanical agitation of one type or another, are known in the art, and include impeller mixers, turbine mixers, rotor-stator mixers, colloid mills, pumps, and pressure homogenizers. In certain embodiment, the in-line mixer(s) can comprise a dynamic mixer such as an electrical submersible pump, hydraulic submersible pump, or a progressive cavity pump. In certain embodiments, the in-line mixer(s) can comprise static mixers. Static mixers are mixers that mix fluids in flow without the use of moving parts. Static mixers are generally constructed from a series of stationary, rigid elements that form intersecting channels to split, rearrange and combine component streams resulting in one homogeneous fluid stream. Static mixers provide simple and efficient solutions to mixing and contacting problems. More affordable than dynamic agitator systems, static mixing units have a long life with minimal maintenance and low pressure drop. Static mixers can be fabricated from metals and/or plastics to fit pipes and vessels of virtually any size and shape. In some cases, the static mixer can comprise a region of pipe, for example a serpentine region of pipe, that facilitates mixing.

The aqueous fluid used to invert the LP composition can comprise from 0 to 250,000 ppm; 15,000 to 160,000 ppm; from 15,000 to 100,000 ppm; from 10,000 to 50,000 ppm; from 15,000 to 50,000 ppm; from 30,000 to 40,000 ppm; from 10,000 to 25,000 ppm; from 10,000 to 20,000 ppm; or from 15,000 to 16,000 ppm total dissolved solids (tds). In an example embodiment, the aqueous fluid can comprise a brine having about 15,000 ppm tds. In one embodiment, the brine may be a synthetic seawater brine as illustrated in Table 1.

TABLE 1

| Ions (ppm) | Synthetic seawater brine |
|---|---|
| Na+ | 10800 |
| K+ | 400 |
| Ca++ | 410 |
| Mg++ | 1280 |
| Cl− | 19400 |
| TDS | 32290 |

The aqueous fluid used to invert the LP compositions can comprise produced reservoir brine, reservoir brine, sea water, fresh water, produced water, water, saltwater (e.g. water containing one or more salts dissolved therein), brine, synthetic brine, synthetic seawater brine, or any combination thereof. Generally, the aqueous fluid can comprise water from any readily available source, provided that it does not contain an excess of compounds that may adversely affect other components in the inverted polymer solution or render the inverted polymer solution unsuitable for its intended use. If desired, aqueous fluids obtained from naturally occurring sources can be treated prior to use. For example, aqueous fluids can be softened (e.g., to reduce the concentration of divalent and trivalent ions in the aqueous fluid) or otherwise treated to adjust their salinity. In certain embodiments, the aqueous fluid can comprise soft brine or hard brine. In certain embodiments, the aqueous fluid can comprise produced reservoir brine, reservoir brine, sea water, or a combination thereof.

In some embodiments, the aqueous fluid can have a temperature of from 1° C. to 120° C. In other embodiments, the aqueous fluid can have a temperature of from 45° C. to 95° C.

The inversion methods described herein can be specifically adapted for use in a particular dewatering application.

The hydrated polymer molecules in the inverted polymer solution can have a particle size (radius of gyration) ranging from 0.01 to 10 µm in one embodiment.

Surfactants can be included to lower the interfacial tension between the oil and water phase to less than about 10-2 dyne/cm (for example) and thereby recover additional oil by mobilizing and solubilizing oil trapped by capillary forces. Examples of surfactants that can be utilized include, but are not limited to, anionic surfactants, cationic surfactants, amphoteric surfactants, non-ionic surfactants, or a combination thereof. Anionic surfactants can include sulfates, sulfonates, phosphates, or carboxylates. Such anionic surfactants are known and described in the art in, for example, U.S. Pat. No. 7,770,641, incorporated herein by reference in its entirety. Examples of specific anionic surfactants include internal olefin sulfonates, isomerized olefin sulfonates, alkyl aryl sulfonates, medium alcohol (C10 to C17) alkoxy sulfates, alcohol ether [alkoxy] carboxylates, and alcohol ether [alkoxy] sulfates. Example cationic surfactants include primary, secondary, or tertiary amines, or quaternary ammonium cations. Example amphoteric surfactants include cationic surfactants that are linked to a terminal sulfonate or carboxylate group. Example non-ionic surfactants include alcohol alkoxylates such as alkylaryl alkoxy alcohols or alkyl alkoxy alcohols. Other non-ionic surfactants can include alkyl alkoxylated esters and alkyl polyglycosides. In some embodiments, multiple non-ionic surfactants such as non-ionic alcohols or non-ionic esters are combined. As a skilled artisan may appreciate, the surfactant(s) selection may vary depending upon such factors as salinity, temperature, and clay content in the reservoir.

Suitable alkalinity agents include basic, ionic salts of alkali metals or alkaline earth metals. Alkalinity agents can be capable of reacting with an unrefined petroleum acid (e.g. the acid or its precursor in crude oil (reactive oil)) to form soap (a surfactant which is a salt of a fatty acid) in situ. These in situ generated soaps can serve as a source of surfactants causing a reduction of the interfacial tension of the oil in water emulsion, thereby reducing the viscosity of the emulsion. Examples of alkali agents include alkali metal hydroxides, carbonates, or bicarbonates, including, but not limited to, sodium carbonate, sodium bicarbonate, sodium hydroxide, potassium hydroxide, sodium silicate, tetrasodium EDTA, sodium metaborate, sodium citrate, and sodium tetraborate. In some cases, the alkalinity agent can be present in the inverted polymer solution in an amount of from 0.3 to 5.0 weight percent of the solution, such as 0.5 to 3 weight percent.

The inverted polymer solution can optionally include a co-solvent. A "co-solvent" refers to a compound having the ability to increase the solubility of a solute in the presence of an unrefined petroleum acid. In embodiments, the co-solvents provided herein have a hydrophobic portion (alkyl or aryl chain), a hydrophilic portion (e.g. an alcohol) and optionally an alkoxy portion. Co-solvents as provided herein include alcohols (e.g. $C_1$-$C_6$ alcohols, $C_1$-$C_6$ diols), alkoxy alcohols (e.g. $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group.

The inverted polymer solution can optionally include a chelant or chelating agent. Chelants may be used to complex with the alkali metal and soften brines. EDTA is just one example of a suitable chelant, another example of a chelant is MGDA ("methylglycinediacetic acid").

If desired, other additives can also be included in inverted polymer solutions described herein, such as biocides, oxygen scavengers, and corrosion inhibitors.

Methods of Use The exemplary liquid polymer compositions and inverted polymer solutions can be utilized in such diverse processes as flocculation aids, centrifugation aids, dewatering of mineral slurries, thin lift dewatering, emulsion breaking, sludge dewatering, raw and waste water clarification, drainage and retention aids in the manufacture of pulp and paper, flotation aids in mining processing, color removal, and agricultural applications. Generally, the exemplary liquid polymer compositions and inverted polymer solutions described herein can be used as process aids in a variety of solid-liquid separation processes, including but not limited to, flocculation, dewatering, clarification and/or thickening processes or applications. As referred to herein, the term "dewatering" relates to the separation of water from solid material or soil by a solid-liquid separation process, such as by wet classification, centrifugation, filtration, or similar processes. In some cases, dewatering processes and apparatus are used to rigidify or improve rigidification of the dispersed particulate materials in the suspension.

In exemplary embodiments, dewatering of a suspension may be carried out by any known dewatering method or apparatus. In certain embodiments, the suspension may be pumped to lagoons, ponds, heaps or stacks and allowed to dewater gradually through the actions of sedimentation, drainage and/or evaporation. Exemplary dewatering methods and apparatus include but are not limited to allowing the suspension to settle or rigidify in a confined disposal facility or deposition area. In some exemplary embodiments, the dewatering is mechanical and employs an apparatus selected from the group consisting of belt press, filter press screw press, centrifuge, plate and frame press, rotary or horizontal vacuum filter, or drying bed.

The exemplary liquid polymer compositions and inverted polymer solutions described herein can be used in a variety of dewatering, clarification and/or thickening applications. For example, the exemplary liquid polymer compositions and inverted polymer solutions can be used in municipal and industrial waste water treatment; clarification and settling of primary and secondary industrial and municipal waste; potable water clarification; in applications in which part or all of the dewatered solids or clarified water is returned to the environment, such as sludge composting, land application of sludge, pelletization for fertilizer application, release or recycling of clarified water, papermaking; food processing applications such as waste dewatering, including waste dewatering of poultry beef, pork and potato, as well as sugar decoloring, sugar processing clarification, and sugar beet clarification; mining and mineral applications, including treatment of various mineral slurries, coal refuse dewatering and thickening, tailings thickening, and Bayer process applications such as red mud settling, red mud washing, Bayer process filtration, hydrate flocculation, and precipitation; biotechnological applications including dewatering and clarification of wastes, such as dewatering and clarification of fermentation broths; and the like.

In exemplary embodiments, the liquid polymer composition or inverted polymer solution may be used to dewater suspended solids. In exemplary embodiments, a method of dewatering a suspension of dispersed solids comprises: (a) intermixing an effective amount of the exemplary liquid polymer composition or inverted polymer solution, with a suspension of dispersed solids, and (b) dewatering the suspension of dispersed solids.

In exemplary embodiments, a method of dewatering an aqueous suspension of dispersed solids comprises: (a) adding an effective amount of providing a liquid polymer (LP) composition or inverted polymer solution to the suspension; (b) mixing the LP composition into the suspension to form a treated suspension; and (c) subjecting the treated suspension to dewatering.

In exemplary embodiments, the aqueous suspension is derived from sewage sludge, municipal water, industrial processes, food processing, mining or mineral production or processing, coal refuse, tailings, Bayer process, hydrate flocculation and precipitation, biotechnological applications, or agricultural applications.

In exemplary embodiments, a method of settling dispersed solids in an aqueous suspension comprises: (a) intermixing an effective amount of the exemplary liquid polymer composition or inverted polymer solution, with a suspension of dispersed solids, and (b) allowing at least a portion of the dispersed solids to settle.

In exemplary embodiments, a method of settling dispersed solids in an aqueous suspension comprises: (a) adding an effective amount of providing a liquid polymer (LP) composition or inverted polymer solution to the suspension; (b) mixing the LP composition into the suspension to form a treated suspension; and (c) allowing the treated suspension to settle.

In certain exemplary embodiments, the aqueous suspension is derived from tailings, for example mature fine tailings. In exemplary embodiments, the liquid polymer composition or inverted polymer solution may be used to dewater or settle suspended solids. In exemplary embodiments, the aqueous suspension is derived from sewage sludge. In exemplary embodiments, the aqueous suspension is a suspension of particulate mineral material, for example a suspension that is a waste material from a mineral processing operation.

In exemplary embodiments, the liquid polymer composition is added to the suspension in the form of an inverted polymer solution. In exemplary embodiments, the treated suspension is a thickened suspension. In exemplary embodiments, the treated suspension is a clarified suspension. In exemplary embodiments, the treated suspension comprises an increased amount of settled solids compared to the untreated suspension. In exemplary embodiments, the treated suspension comprises a decreased amount of dispersed solids compared to the untreated suspension.

In an exemplary embodiment, an aqueous admixture of the liquid polymer composition is prepared by intermixing the liquid polymer with water, or by dissolving the liquid polymer composition in water to form a dilute polymer solution. In this context, effective amounts of liquid polymer composition are determined, at least in part, on the necessary or desired results.

The exemplary liquid polymer compositions or inverted polymer solutions may be employed in the above applications alone, in conjunction with, or serially with, other known treatments.

In exemplary embodiments, the exemplary the liquid polymer compositions or inverted polymer solutions may be used in method of deinking of paper mill process water. Recycled paper is increasingly used as a pulp source. One of the major pulping steps involves removal of the ink from any source of printed recycled paper. Large volumes of water are required for the ink removal process and its clean-up is accomplished using a solids/liquid separation unit operation. Effective clean-up of the deinking wash waters is desirable because reuse of the water generated can lead to reduced sheet quality such as brightness. Also, if these waters are used for other purposes, it is desirable to minimize the amounts of BOD/COD and suspended solids.

Dissolved air flotation (DAF) is commonly used for ink removal. Dissolved air flotation is a solids-removal process where fine air bubbles become attached to the suspended particles, thus reducing the density of individual particles and causing them to float to the surface. The separated solids then form a floating layer that is a mixture of solids and air bubbles. The buoyant force exerted by the entrapped air also acts to compact the solids into a smaller volume before the floating layer is skimmed off. A clarification aid may be added along with the air to improve results. Flotation methods can achieve high levels of suspended solids removal, up to 98%.

In other exemplary embodiments, a method of clarifying industrial waste water comprises: adding to the waste water an effective amount of an LP composition; and clarifying the industrial waste water.

Clarification generally refers to the removal of nonsettleable material by coagulation, flocculation and/or sedimentation. Coagulation is the process of destabilization by charge neutralization. Once neutralized, particles no longer repel each other and can be brought together. Coagulation is useful for removal of colloidal sized suspended matter. Flocculation may be used together with coagulation to agglomerate the destabilized, "coagulated" particles to form a larger agglomeration or floc.

Clarification chemicals may be utilized in conjunction with mechanical clarifiers for the removal of solids from the process water stream. The clarification chemicals coagulate and/or flocculate the suspended solids into larger particles, which can then be removed from the process stream, for example by gravitational settling or flotation.

In exemplary methods the liquid polymer compositions or inverted polymer solutions may be used as the sole treatment agent or process aid. In other embodiments, the liquid polymer compositions or inverted polymer solutions can be used in combination with other treatment agents and process aids. In exemplary embodiments, the method further comprises adding an organic or inorganic coagulant to the waste water.

In exemplary embodiments, the exemplary the liquid polymer compositions or inverted polymer solutions may be used in method of sludge dewatering. An exemplary method of dewatering sludge comprises: adding to the waste water an effective amount of an LP composition or inverted polymer solution; and dewatering the sludge.

In exemplary embodiments, the exemplary the liquid polymer compositions or inverted polymer solutions may be used in method of clarification of oily waste water. In an exemplary method, removing oil from waste water comprises: adding to the waste water an effective amount of an LP composition; and removing the oil from said waste water.

Oily waste waters are produced in various industrial processes, such as those in the steel and aluminum industries, chemical processing industry (CPI), food processing industry, automotive industry, laundry industry, and refinery industry. In these industries, highly refined oils, lubricants and greases contact water for various purposes according to the respective industry or process. This results in a waste water streams having highly dispersed or emulsified oil. For example, in the steel and aluminum industries, waste water from steel and aluminum mills using hot rolling mills contain lubricating and hydraulic pressure hydrocarbons. Waste water from cold rolling mills contains oils that lubricates the sheets and reduces rust. Specifically, in cold rolling mills, oil-in-water emulsions are sprayed on the metal during rolling to act as coolants. Also, metalworking plants generate waste water streams containing lubricating and cutting oils, lapping and deburring compounds, grinding and other specialty fluids. These oils are generally highly refined hydrocarbons. Refinery waste oil comes from two different sources: (1) Skimmings from the water clarification equipment, i.e., DAF's, API separators, and consisting mainly of crude oil; and, (2) Leakage from processes collected via traps and drains throughout the plant. This oil is usually sent to a waste water treatment plant.

Other oily waste waters include waste waters from cotton and wool manufacturing plants which contain oils and greases from the scouring, desizing and finishing operations. Processes in other industries also generate oily waste water such as: paints, surface coatings, and adhesives; soaps and detergents; dyes and inks; and the leather industry. In each of the industries described above, the oils used in process ultimately contaminate waste water streams as highly dispersed or oil-in-water emulsions.

In addition to oils, these waste waters may include contaminants such as solids, silt, metal particles, emulsifiers, cleaners, soaps, solvents, and other residues. Their concentration in the waste water may vary from only a few parts per million to as much as 5 to 10% by volume.

Emulsions may be broken by chemical, electrolytic, and/or physical methods. The breaking of an emulsion is also called resolution, since the aim is to separate the original mixture into its parts. Chemicals are commonly used for the treatment of oily waste waters, and are also used to enhance mechanical treatment. In breaking emulsions, the stabilizing factors may be neutralized to allow the emulsified droplets to coalesce. The accumulated electric charges on the emulsified droplet are neutralized to allow the emulsified droplets to coalesce. The accumulated electric charges on the emulsified droplet are neutralized by introducing a charge opposite to that of the droplet. Chemical emulsion breakers provide this opposite charge, and are thus usually ionic in nature.

The treatment of oily waste water is sometimes divided into two steps, i.e., coagulation, which is the destruction of the emulsifying properties of the surface active agent or neutralization of the charged oil droplet, and flocculation, which is the agglomeration of the neutralized droplets into large, separable globules.

The exemplary liquid polymer compositions or inverted polymer solutions can be used to treat, clarify or demulsify such waste water.

The exemplary the liquid polymer compositions or inverted polymer solutions also may be used in a method of clarifying food processing waste. Such food processing waste contaminates the water stream flowing through the food processing system. For example, poultry farm waste water effluents are enriched with fat, oil, blood and other solids from the poultry process. These by-products, such as fat, blood, and tissue, may be present in the waste water in a range of several hundred to tens of thousands of ppm.

The removal of such solids is helpful to improve water quality for recycled process water or discharge water. For example, removal of the solids can be important to meet established discharge limits for total dissolved solids (TDS), chemical oxygen demand (COD), biological oxygen demand (BOD) and total organic carbon (TOC) into local sewers and rivers set by local, state, and federal governments.

In another exemplary embodiment, the liquid polymer composition or inverted polymer solution may be used in a process for making paper or paperboard from a cellulosic stock. In another exemplary embodiment, the liquid polymer composition or inverted polymer solution may be used in as a strength aid in a process for making paper or paperboard from a cellulosic stock. In another exemplary embodiment, the liquid polymer composition or inverted polymer solution may be used in as a retention and drainage aid in a process for making paper or paperboard from a cellulosic stock. During the manufacture of paper or paper board a cellulosic thin stock is drained on a moving screen (often referred to as a machine wire) to form a sheet which is then dried. One or more polymers may be added to the cellulosic suspension to flocculate the cellulosic solids to form a sheet and/or enhance drainage on the moving screen. In an exemplary embodiment, a process for making paper or paperboard comprises forming a cellulosic suspension, flocculating the suspension by the addition of the exemplary liquid polymer composition or inverted polymer solution, and draining the suspension on a screen to form a sheet.

Other applications which may benefit from the exemplary liquid polymer compositions include soil amendment, reforestation, erosion control, seed protection/growth, etc., in which the liquid polymer composition or inverted polymer solution is applied to soil.

By way of non-limiting illustration, examples of certain embodiments of the present disclosure are given below.

EXAMPLES

Example 1. Filter Ratio Testing and Viscosity Measurements of Exemplary Inverted Polymer Solutions Methods and Materials A synthetic brine was used as base brine. The synthetic brine included the following: $Na^+$, $Ca^{2+}$, $Mg^{2+}$, $Cl^-$, and TDS of about 15,000 ppm. The liquid polymer (LP) composition consisted of an acrylamide and acrylic acid copolymer (30% mol charge) in an oil-continuous polymer dispersion with an active polymer concentration of 50%, the LP composition was inverted and diluted to target an active polymer concentration of 2000 ppm in the synthetic brine by mixing at 500 rpm using an overhead mixer. In the laboratory, 50% neat liquid polymer was inverted to 1% LP solution in the synthetic brine using the overhead mixer at 500 rpm for 2 hours. Then, the 1% inverted LP solution was diluted to the targeted 0.2% LP solution in the synthetic brine using the overhead mixer at 500 rpm for 2 hours to 24 hours. The LP composition was also directly inverted to the target active polymer concentration of 0.2% LP polymer in the synthetic brine using the overhead mixer for 3 hours to 24 hours.

The filter ratio (FR) of the inverted polymer solutions was determined using the standard procedure described, for example, in Koh, H. *Experimental Investigation of the Effect of Polymers on Residual Oil Saturation*. Ph.D. Dissertation, University of Texas at Austin, 2015; Levitt, D. *The Optimal Use of Enhanced Oil Recovery Polymers Under Hostile Conditions*. Ph.D. Dissertation, University of Texas at Austin, 2009; and Magbagbeola, O. A. Quantification of the Viscoelastic Behavior of High Molecular Weight Polymers used for Chemical Enhanced Oil Recovery. M.S. Thesis, University of Texas at Austin, 2008, each of which is hereby incorporated by reference in its entirety. Briefly, a 300 ml solution of 2000 ppm inverted LP solution in synthetic brine was filtered through a 5.0 μm and 1.2 μm ISOPORE™ polycarbonate filter with a diameter of 47 mm at 15 psi (plus or minus 10% of 15 psi) pressure and ambient temperature (25° C.). As expressed in the formula below, the FR was calculated as the ratio of the time for 180 to 200 ml of the polymer solution to filter divided by the time for 60 to 80 ml of the polymer solution to filter.

$$FR = \frac{t_{200\ ml} - t_{180\ ml}}{t_{80\ ml} - t_{60\ ml}}$$

For the composition to qualify for further testing, the composition was required to exhibit a FR of less than or equal to 1.2 through both filters. As the FR was a strict laboratory requirement for polymer qualification, clean, laboratory-grade filtered water was used when necessary.

Steady-state shear viscosities were measured in the range of 0.1 s-1 to 1000 s-1 at 25° C., and 31° C. using double-wall couette geometry with a TA Instruments ARES-G2 rheometer.

Figure 4:
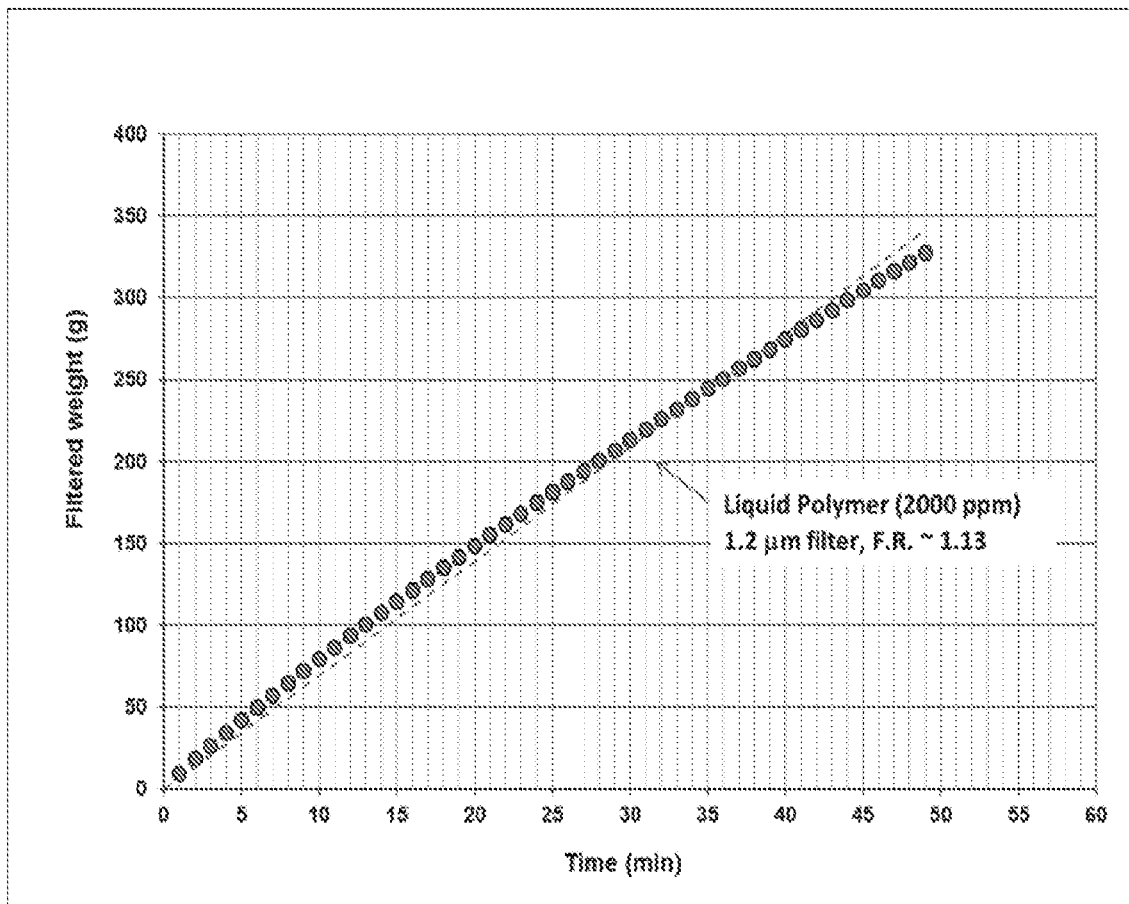
FIG. 4 is a plot of the filtration ratio test performed using a 1.2 micron filter for an inverted polymer solution. The inverted polymer solution (2000 ppm polymer) passes through 1.2 micron filter with a filter ratio of less than 1.5, which shows improved filterability of the inverted polymer solution.

Results and Discussion FR test: FIG. 4 shows a plot of the FR test performed for an inverted polymer solution using a 1.2 micron filter with a diameter of 47 mm at 15 psi pressure and 25° C. temperature. As shown in FIG. 4 and Table 2, the inverted LP solution (2000 ppm polymer) passes through 1.2 micron filter with a FR of less than or equal to 1.5. More specifically, FIG. 11 illustrates a FR of 1.2 or less. Even more specifically, FIG. 4 illustrates a FR of 1.13. This result indicates the improved filterability of the inverted polymer solution.

Figure 5:
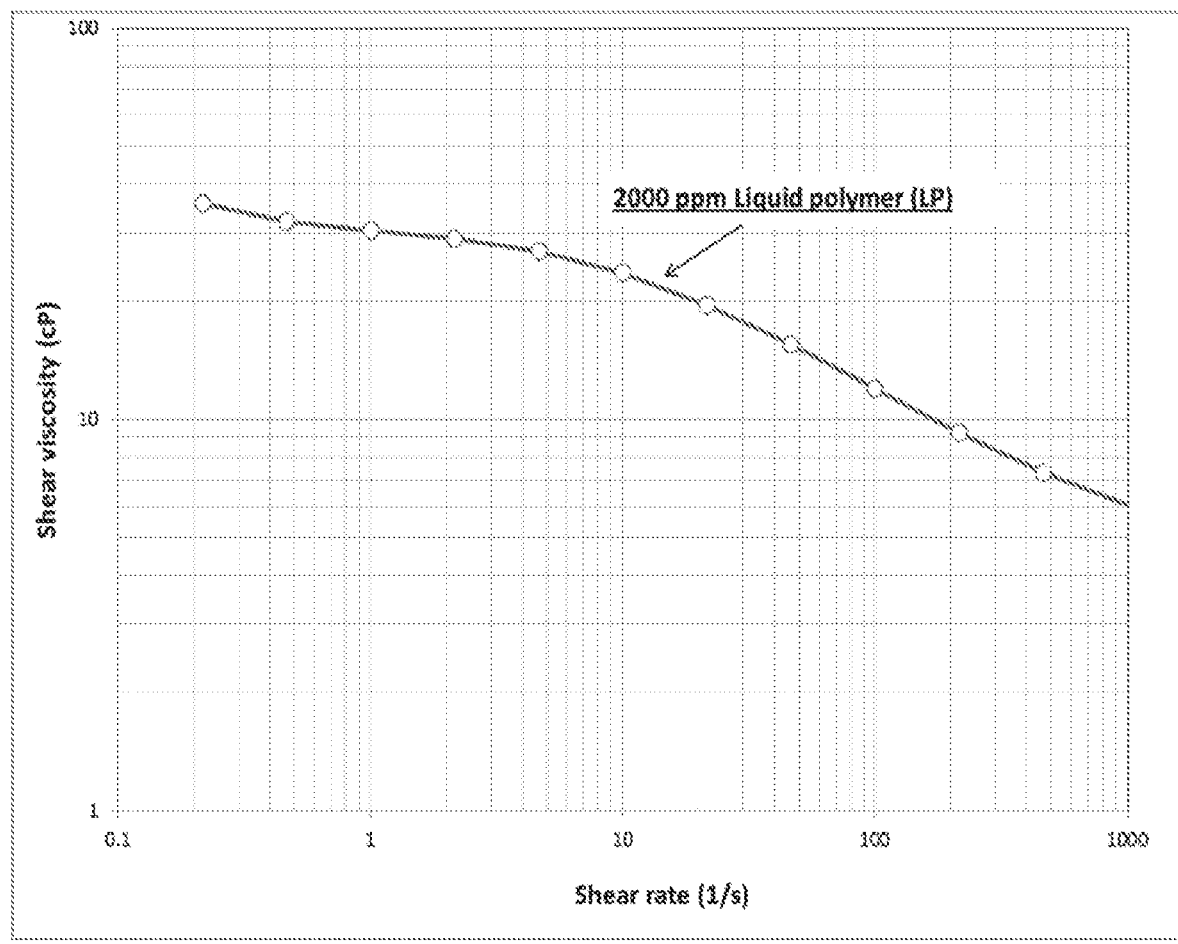
FIG. 5 is a viscosity plot in the wide range of shear rate for an inverted polymer solution (2000 ppm polymer in synthetic brine, measured at 31° C.). The viscosity of the inverted polymer solution shows a typical shear-thinning behavior in the wide range of shear rate. The viscosity is measured as 24 cP at 10 s-1 and 31° C.
Figure 6:
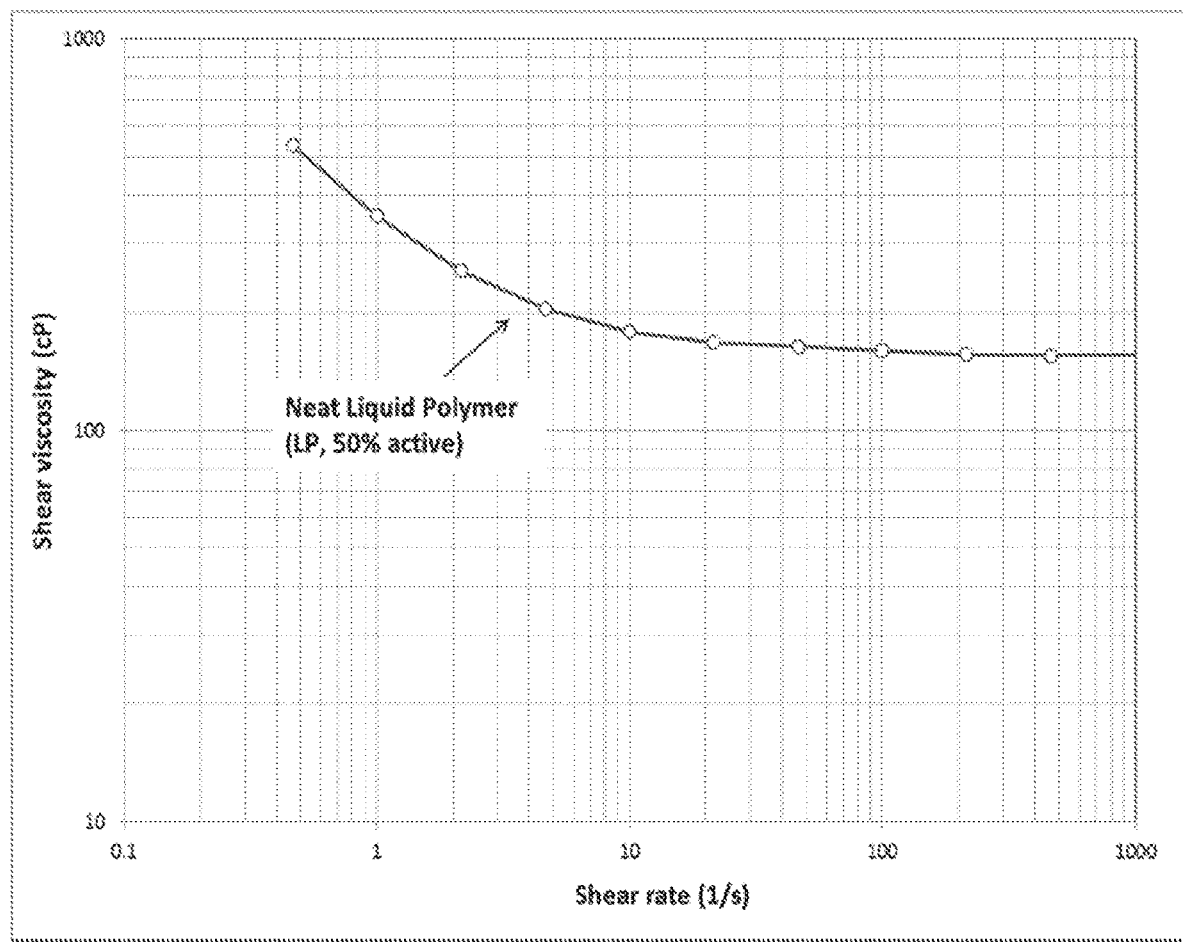
FIG. 6 is a viscosity plot in the wide range of shear rate for neat LP composition.

Viscosity measurement: FIG. 5 shows a viscosity plot for a wide range of shear rates for an inverted polymer solution (2000 ppm polymer in synthetic brine, measured at 31° C.). The viscosity of the inverted polymer solution illustrates a typical shear-thinning behavior in the wide range of shear rate. The viscosity is measured as 24 cP at 10 s-1 and 31° C. FIG. 6 shows a viscosity plot for a wide range of shear rates for the neat LP. The activity of the neat LP composition test is 50% and the viscosity of LP is measured at 180 cP at 10 $s^{-1}$ and 25° C. Low viscosity with high activity makes the LP composition easy to handle in the field.

TABLE 2

Summary of Properties of Exemplary Inverted Polymer Solution

| Polymer | Active Polymer Concentration (ppm) | 5 µm filter (15 psi, 25° C.) | | 1.2 µm filter (15 psi, 25 C.) | | Viscosity (cP) @ 31° C. |
|---|---|---|---|---|---|---|
| | | F.R | Time to 200 g (min) | F.R | Time to 200 g (min) | 10 $s^{-1}$ |
| LP | 2000 | 1.00 | 5.0 | 1.13 | 27 | 22 |
| | 2000 | 1.01 | 4.4 | 1.19 | 25 | 21 |
| | 2000 | 1.04 | 5.7 | 1.18 | 24 | 25 |

Example 2. Settling Performance of Tailings Samples Treated with an Exemplary Liquid Polymer Composition In the following example, tailings samples (mature fine tailings from Alberta Canada, 33.5% solids) were flocculated with an exemplary inverted polymer solution at various doses and compared to an untreated control composition.

Each tailings sample (59.7 g) was diluted to 10% solids with process water. The exemplary LP composition consisted of 50.75 weight % active of an acrylamide and acrylic acid copolymer (30% mol charge), and was made down in tap water at 0.5 weight % (0.25% active polymer concentration) and mixed for 3 hours to form an inverted polymer solution. The exemplary inverted polymer solution was added into the dilute tailings samples at dosages of 50, 75 or 150 ppm using an overhead stirrer. The treated, dilute tailings sample was then transferred to a graduated cylinder, and the settling of solids was monitored over 10 minutes. At the end of the settling period, the top 20 mL of supernatant was sampled and the solids content measured gravimetrically.

Figure 7:
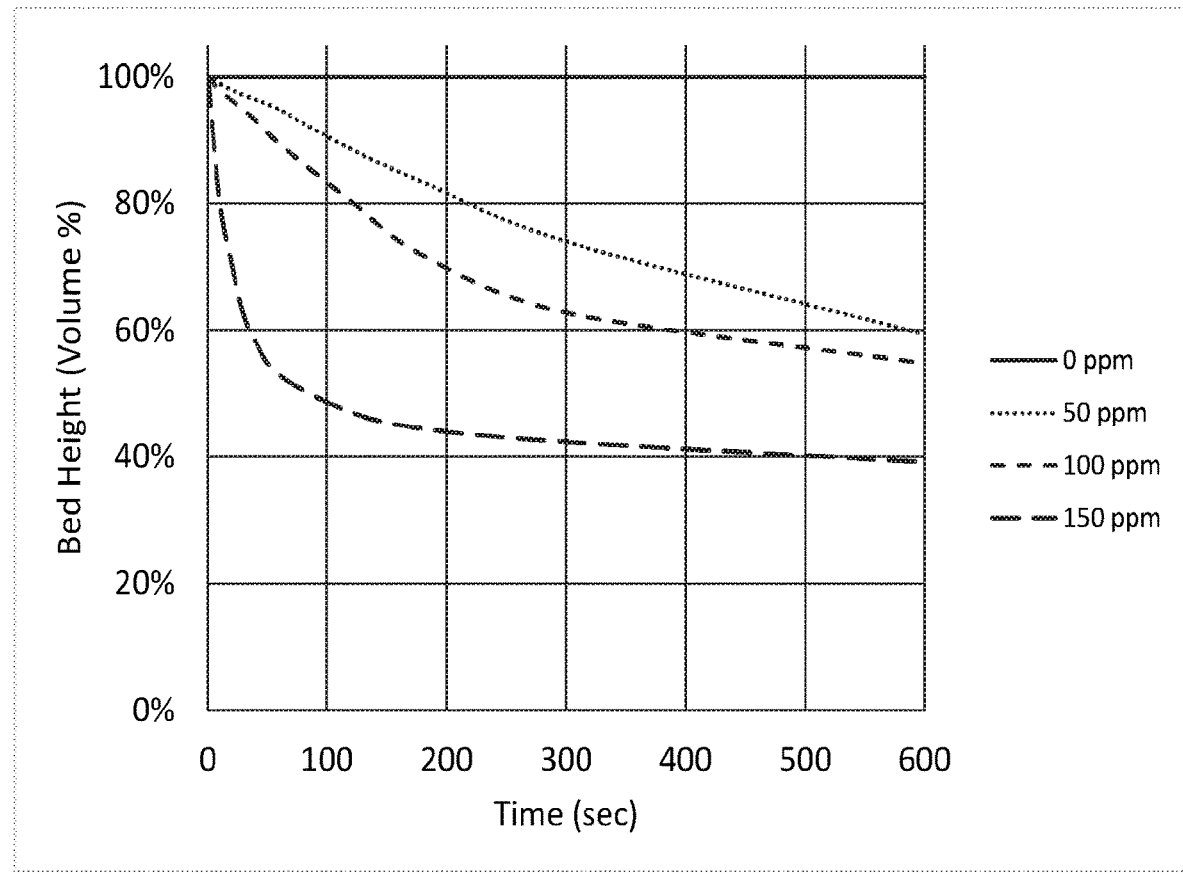
FIG. 7 is a plot of the settling performance resulting from the treatment of dilute tailings with an exemplary inverted polymer solution at three different dosages (50, 100 and 150 ppm), and of an untreated sample of the tailings (0 ppm).
Figure 8:
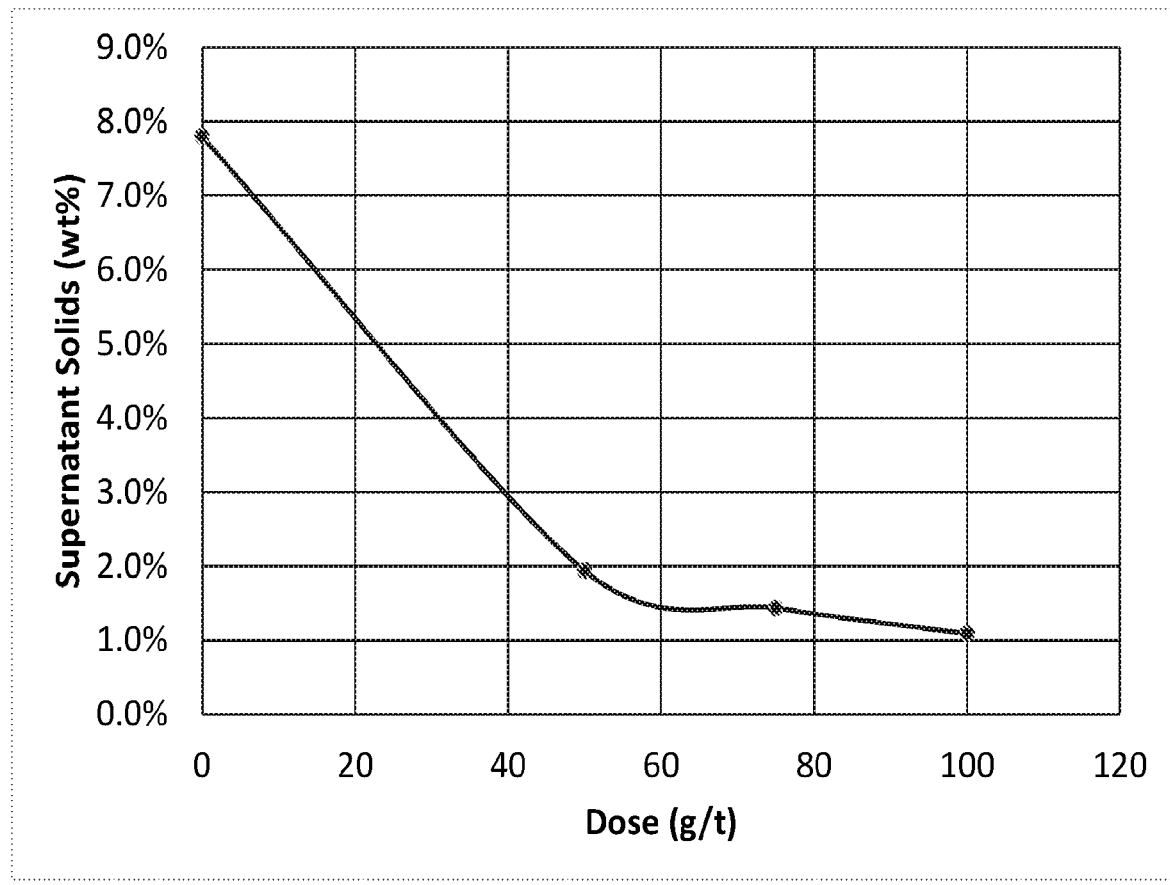
FIG. 8 is a plot of the weight percent of supernatant solids resulting from the treatment of dilute tailings with an exemplary inverted polymer solution at three different dosages (50, 100 and 150 ppm), and of an untreated sample of the tailings (0 ppm).

The results presented in FIGS. 7 and 8 demonstrated that treatment of the dilute tailings with the exemplary inverted polymer solution resulted in an increased settling rate and improved fines capture.

Example 3. Centrifugation of Tailings Samples Treated with an Exemplary Liquid Polymer Composition In the following example, tailings samples (mature fine tailings, 33.5% solids) were flocculated with an exemplary inverted polymer solution and compared to an untreated control composition. For the experiment, 600 ppm of an exemplary inverted polymer solution was added to 500 g of the tailings sample using an overhead stirrer. The dewatering efficiency of the treated tailings sample was measured with a Capillary Suction Time (CST) instrument from OFI Testing Equipment, Inc. The remaining treated tailings sample was then centrifuged at 1090 rcf for 2 minutes. The solids content of the centrate and centrifuged cake were then measured gravimetrically.

Figure 9:
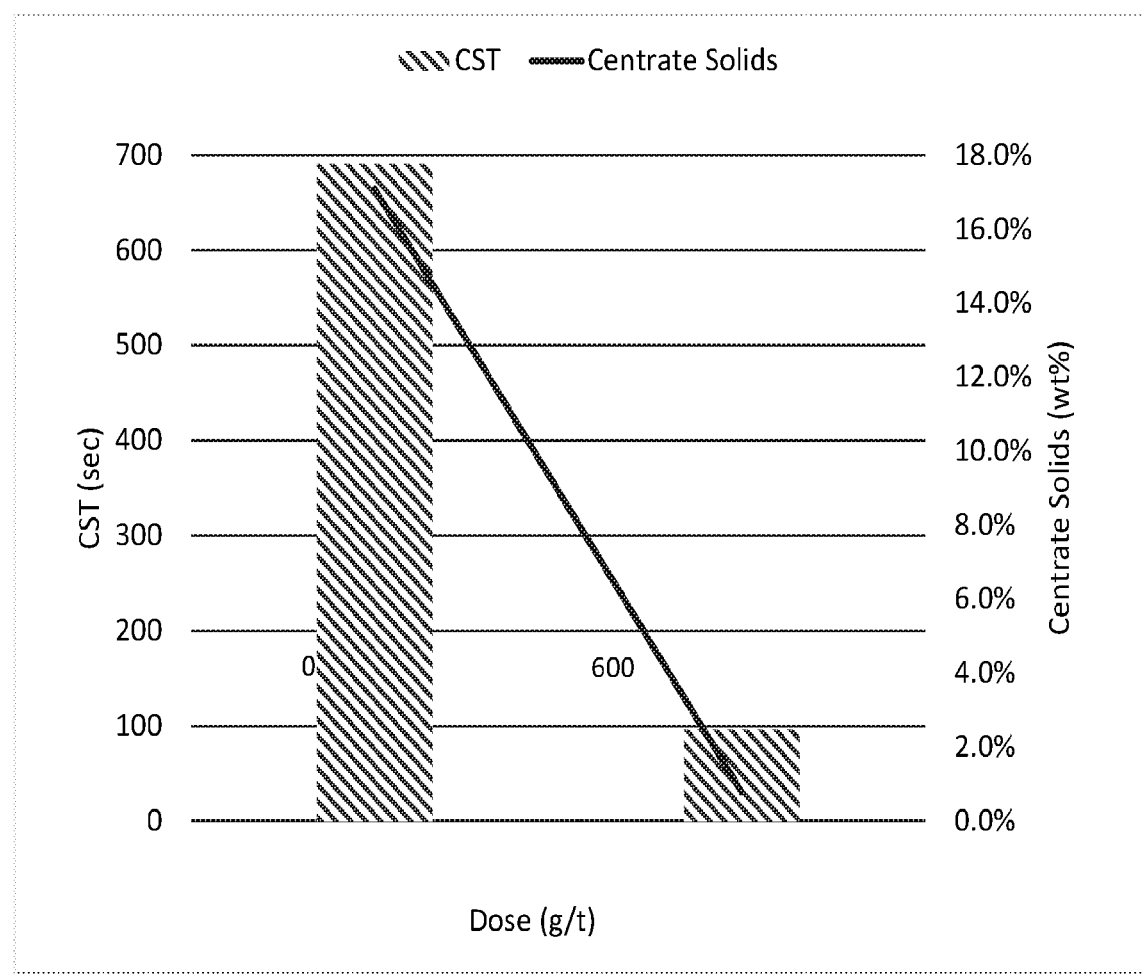
FIG. 9 is a chart of Capillary Suction Time (CST) and Centrate Solids versus the Dose resulting from the treatment of a tailings sample with an exemplary inverted polymer solution (600 ppm) and from an untreated sample of the tailings.

The results presented below in FIG. 9 demonstrated that treatment of the dilute tailings with the exemplary inverted polymer solution resulted in a faster CST and improved fines capture for the centrate.

Example 4. Use an Exemplary Liquid Polymer Composition as a Strength Aid for Paper In this example, a strength study was conducted using an exemplary liquid polymer composition comprising an acrylamide-acrylic acid co-polymer having an anionic charge of about 30 mol % (about 50% active polymer concentration). The liquid polymer composition was inverted by mixing 2 g of the liquid polymer composition as-is with 198 g DI water. After 15 minutes the inverted polymer solution was diluted again 10× in DI water prior to adding to the samples as described below. The addition rates reported below reflect the amount of liquid polymer composition added as-is (before inversion and dilution).

Handsheet Preparation

Sample handsheets were prepared using a thick stock having a consistency of about 4.9% with fiber composition comprising 50% softwood and 50% ground wood. The thick stock was diluted to a consistency of about 0.39% with white water and synthetic water treated with 40 ppm of calcium ion and 330 ppm of sulfate ion to target conductivity of 1.1 mS/cm. The pH of the diluted stock was adjusted to 7.1 to 7.2. To this stock, chemical additives were added. The chemical mixing time and addition sequence are listed in Table 3.

TABLE 3

| Step | Component | Amount | Mix time |
|---|---|---|---|
| a | Cationic coagulant[1] | 0.3 kg/ton | 15 seconds |
| b | Additive 1 (See Table 4) | See Table 4 | 10 seconds |
| c | Additive 2-Exemplary Liquid Polymer Composition (before inversion and dilution) | See Table 4 | 25 seconds |
| d | Ground calcium carbonate (GCC)[2] | 9% | 13 seconds |
| e | Cationic flocculant[3] | 0.2 kg/ton | 12 seconds |

[1]Commercially available polyamine cationic coagulant.
[2]Commercially-available ground calcium carbonate.
[3]Commercially-available cationic polyacrylamide flocculant.

A Dynamic Sheet Former was used to prepare the handsheets according to standard protocol. The target basis weight was 75 gsm. Sheets were pressed at 15 psi and drum dried for 60 seconds at 115° C. The sheets were post cured for 5 minutes at 105° C. Prior to the paper physical testing, the paper sheets were conditioned at least overnight at 23° C. and 50% relative humidity. This follows the TAPPI T 402 om-93, Standard Conditioning and Testing Atmospheres for Paper, Board, Pulp hand sheet, and Related Products method.

Test Method—Dry Tensile Strength

Tensile strength is measured by applying a constant-rate-of-elongation to a sample and recording three tensile breaking properties of paper and paper board: the force per unit width required to break a specimen (tensile strength), the percentage elongation at break (stretch) and the energy absorbed per unit area of the specimen before breaking (tensile energy absorption). Only the cross-directional (CD) dry tensile strength measurement is reported. This method is applicable to all types of paper, but not to corrugated board. This procedure references TAPPI Test Method T494. Twelve measurements were taken per condition and standard deviations were reported. The results are normalized to 75 gsm basis weight. A Thwing-Albert QC3A Series tensile tester was used for this study.

Test Method—Internal Bond

This test determines the internal bonding strength of paper or paperboard by measuring the average energy required to separate the specimen into two plies. The internal bond test is used to measure the forces that separate the fibers within a ply in a sheet of paper. A paper specimen is bonded on both sides by a double-sided adhesive paper tape and adhered to a metal base and to a right-angled metal fixture. The right-angled fixture is impacted by a pendulum perpendicular to the surface of the paper. The impact results in delamination at the weakest point of the assemblage, the paper. Results are reported in ft-lb and follow TAPPI T833 pm-94 Test for Inter-fiber Bond Using the Internal Bond Tester. The higher the value, the higher the internal bond strength of the paper. Ten measurements were taken per condition using a HUYGEN Internal Bond Tester and average value were reported.

Results

Handsheets were prepared using the method above, and additives identified in Table A-1. Internal Bond, Dry Strength, and Ash Content were measured for each sample and recorded in Table 4.

TABLE 4

| Sample: | Additive 1 | Additive 2 | Internal Bond (J/m3) | CD Dry Strength (kN/m) | Ash Content (A) |
|---|---|---|---|---|---|
| A-0 (comparative) | 0 | 0 | 286 | 1.33 | 15.2% |
| A-1 (comparative) | 6 kg/t GPAM[1] | 0 | 342 | 1.35 | 22.0 |
| A-2 | 6 kg/t GPAM[1] | 1 kg/t | 370 | 1.42 | 22.5 |
| A-3 | 2.7 kg/t coagulant[2] | 1 kg/t | 374 | 1.40 | 21.7 |

[1]Commercially available glyoxalated polyacrylamide.
[2]Commercially-available polyamine cationic coagulant.

As shown, addition of the exemplary inverted polymer solution improved internal bond and dry strength properties of the samples.

Example 5. Use an Exemplary Liquid Polymer Composition for Retention and Drainage in the Manufacture of Pulp and Paper In this example, a retention and drainage study was conducted using an exemplary liquid polymer composition comprising an acrylamide-acrylic acid co-polymer having an anionic charge of about 30 mol % (about 50% active polymer concentration). The liquid polymer composition was inverted by mixing 2 g of the liquid polymer composition as-is with 198 g DI water. After 15 minutes the inverted polymer solution was diluted again 10× in DI water prior to adding to the samples as described below. The addition rates reported below reflect the amount of liquid polymer composition added as-is (before inversion and dilution).

A furnish composition was prepared similar to handsheet study (50% bleached Kraft and 50% groundwood). There is not additional GCC added this case. The thick stock was diluted with white water and synthetic water to a consistency of 0.39% and target conductivity about 420 µS/cm. An aliquot of 400 mL of diluted pulp was used for each chemical treatment. The stirrer speed was set at 900 RPM. The stirrer mixing profile and chemical addition sequence are shown in Table 5.

TABLE 5

| Time | |
|---|---|
| @ 0 seconds | Start the stirrer |
| @ 5 seconds | Add Additive 1 (GPAM or Cationic Coagulant), if used |
| @ 15 seconds | Add Additive 2 (Exemplary Liquid Polymer Composition), if used |
| @ 16 seconds | Add Additive 3 (Colloidal Silica), if used |
| @ 25 seconds | Stop Stirrer and drain |

The treated stock solutions were each filtered through a 100 mesh (0.150 mm) DDA screen under 250 mBar vacuum to collect filtrate for 40 seconds. For each sample, the time needed to show a vacuum break (significant vacuum drop) was used as the indication of drainage. The filtrate collected was tested for turbidity (retention). The permeability is an indication of cough vacuum (the openness of the wet web).

Results

Test furnish compositions were prepared using the additives identified in Table 6. Drainage, Permeability and Turbidity were measured for each sample and recorded in Table 6.

TABLE 6

| Sample | Additive 1 | Additive 2 | Additive 3 | Drainage (second) | Permeability (PSI) | Turbidity (NTU) |
|---|---|---|---|---|---|---|
| B-0 (comparative) | 0 | 0 | 0 | 21.9 | 243.30 | 1028 |
| B-1 (comparative) | 3 kg cationic coagulant[1] | 0 | 0 | 15.5 | 238.80 | 692 |
| B-2 | 3 kg/t cationic coagulant[1] | +.67 kg/t | 0 | 7.3 | 189.82 | 385 |
| B-3 | 3 kg/t cationic coagulant[1] | 1.0 kg/t | 0 | 6.9 | 166.69 | 340 |
| B-4 | 3 kg/t cationic coagulant[1] | .67 kg/t | +1 kg/t silica[3] | 5.3 | 166.10 | 361 |

TABLE 6-continued

| Sample | Additive 1 | Additive 2 | Additive 3 | Drainage (second) | Permeability (PSI) | Turbidity (NTU) |
|---|---|---|---|---|---|---|
| B-5 (comparative) | 6 kg/t GPAM[2] | 0 | 0 | 7.9 | 204.98 | 432 |
| B-6 | 6 kg/t GPAM[2] | .67 kg/t | 0 | 4.5 | 145.63 | 161 |

[1]Commercially available polyamine cationic coagulant.
[2]Commercially-available glyoxalated polyacrylamide.
[3]Commercially-available colloidal silica.

As shown, addition of the inverted polymer composition to the samples improved retention and drainage properties of the samples.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method comprising:
   inverting a liquid polymer (LP) composition in an aqueous fluid to provide an inverted polymer solution having a concentration of synthetic (co)polymer of from 50 to 15,000 ppm;
      wherein the LP composition comprises (i) one or more hydrophobic liquids, (ii) one or more synthetic (co)polymers, (iii) one or more emulsifying surfactants having an HLB value of from 2 to 10, (iv) one or more inverting surfactants, and (v) water present in an amount of less than 10% by weight based on the total weight of all the components of the LP composition;
      wherein the inverted polymer solution has a filter ratio of 1.5 or less at 15 psi using a 1.2 μm filter; and
   contacting a process water stream with the inverted polymer solution, wherein the process water stream comprises one or more contaminants, the one or more contaminants comprising solids, silt, metal particles, emulsifiers, cleaners, soaps, solvents, or a combination thereof, and wherein the contacting is effective to dewater, flocculate, clarify, thicken, or coagulate the process water stream.

2. The method of claim 1, wherein the one or more synthetic (co)polymers are present in the liquid polymer (LP) composition at an amount of at least 39%, by weight, based on the weight of the LP composition.

3. The method of claim 1, wherein the liquid polymer (LP) composition is in the form of an inverse emulsion, and the one or more synthetic (co)polymers are present in the LP composition at any amount of up to 38%, by weight, based on the weight of the LP composition.

4. The method of claim 1, wherein the inverted polymer solution is an aqueous unstable colloidal suspension.

5. The method of claim 1, wherein the inverted polymer solution is an aqueous stable solution.

6. The method of claim 1, wherein the aqueous fluid further comprises a surfactant, an alkalinity agent, a co-solvent, a chelating agent, or a combination thereof.

7. The method of claim 1, wherein the one or more synthetic (co)polymers comprise one or more acrylamide (co)polymers.

8. The method of claim 1, wherein the one or more synthetic (co)polymers are present in the LP composition at an amount of less than 12% by weight, based on the total weight of the LP composition.

9. A method of dewatering a suspension of dispersed solids, the method comprising:
   (a) intermixing an effective amount of a liquid polymer (LP) composition or an inverted polymer solution, with a suspension of dispersed solids; and
   (b) dewatering the suspension of dispersed solids;
   wherein the inverted polymer solution has a filter ratio of 1.5 or less at 15 psi using a 1.2 μm filter;
   wherein the inverted polymer solution is formed from inverting the liquid polymer (LP) composition in an aqueous fluid, the LP composition comprising:
      (i) one or more synthetic (co)polymers dispersed or emulsified in one or more hydrophobic liquids,
      (ii) one or more emulsifying surfactants having an HLB value of from 2 to 10,
      (iii) one or more inverting surfactants, and
      (iv) water present in an amount of less than 10% by weight based on the total weight of all the components of the LP composition; and
   wherein the suspension of dispersed solids is derived from a sewage sludge, municipal water, industrial processes, food processing, mining or mineral production or processing, coal refuse, tailings, Bayer process, hydrate flocculation and precipitation, biotechnological applications, or agricultural applications.

10. The method of claim 9, wherein the one or more synthetic (co)polymers are present in the liquid polymer (LP) composition at an amount of at least 39%, by weight, based on the weight of the LP composition.

11. The method of claim 9, wherein the liquid polymer (LP) composition is in the form of an inverse emulsion, and the one or more synthetic (co)polymers are present in the LP composition at any amount of up to 38%, by weight, based on the weight of the LP composition.

12. The method of claim 9, wherein the inverted polymer solution is an aqueous unstable colloidal suspension.

13. The method of claim 9, wherein the one or more synthetic (co)polymers comprise one or more acrylamide (co)polymers.

14. The method of claim 9, wherein the one or more synthetic (co)polymers are present in the LP composition at an amount of less than 12% by weight, based on the total weight of the LP composition.

15. The method of claim 9, wherein the one or more emulsifying surfactants have an HLB value of from 2 to less than 7.

* * * * *